(12) United States Patent
Barrett et al.

(10) Patent No.: US 8,156,534 B2
(45) Date of Patent: *Apr. 10, 2012

(54) SEAMLESS DIGITAL CHANNEL CHANGING

(75) Inventors: Peter T. Barrett, San Francisco, CA (US); James A. Baldwin, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 347 days.

This patent is subject to a terminal disclaimer.

(21) Appl. No.: 12/391,268

(22) Filed: Feb. 24, 2009

(65) Prior Publication Data
US 2009/0161769 A1 Jun. 25, 2009

Related U.S. Application Data

(63) Continuation of application No. 10/218,675, filed on Aug. 13, 2002, now Pat. No. 7,523,482.

(51) Int. Cl.
H04N 7/173 (2011.01)
(52) U.S. Cl. .......... 725/120; 725/90; 725/118; 725/119
(58) Field of Classification Search .............. 725/38, 725/86, 90, 91, 92, 93, 94, 95, 105, 115, 725/116, 118, 119, 120; 375/240.12, 240.13, 375/240.14, 240.15, 240.25, 240.26
See application file for complete search history.

(56) References Cited

U.S. PATENT DOCUMENTS

| | | |
|---|---|---|
| 5,461,415 A | 10/1995 | Wolf et al. |
| 5,473,362 A | 12/1995 | Fitzgerald et al. |
| 5,583,868 A | 12/1996 | Rashid et al. |
| 5,631,694 A | 5/1997 | Aggarwal et al. |
| 5,699,362 A | 12/1997 | Makam |
| 5,724,648 A | 3/1998 | Shaughnessy et al. |
| 5,732,217 A | 3/1998 | Emura |
| 5,822,537 A | 10/1998 | Katseff et al. |
| 5,884,141 A | 3/1999 | Inoue et al. |
| 5,892,915 A | 4/1999 | Duso et al. |
| 5,926,230 A | 7/1999 | Niijima et al. |
| 5,926,659 A | 7/1999 | Matsui |
| 5,963,202 A | 10/1999 | Polish |
| 6,047,317 A | 4/2000 | Bisdikian et al. |
| 6,078,594 A | 6/2000 | Anderson et al. |

(Continued)

FOREIGN PATENT DOCUMENTS
CA 2480461 A1 10/2003
(Continued)

OTHER PUBLICATIONS
Mckinley, et al., "Group Communication in Multichanel Networks with Staircase Interconnection Topoloigies", Computer Communication Review, ACM, Sep. 1989, vol. 19, No. 4, pp. 170-181.

(Continued)

*Primary Examiner* — Kristine Kincaid
*Assistant Examiner* — John Schnurr

(57) ABSTRACT

Seamless channel changing in a digital-television-based entertainment network can be implemented, for example, by providing an intra frame to a client device upon a change to a new channel even when the broadcast video data is previously compressed. In an exemplary implementation, a method includes: receiving a stream of broadcast video data that is encoded; continuously decoding the stream of broadcast video data into successive decoded images; and transmitting, responsive to a channel change message received from a client device, an intra frame that has been encoded from a decoded image of the successive decoded images. Other exemplary implementations are described herein.

16 Claims, 10 Drawing Sheets

U.S. PATENT DOCUMENTS

| | | | |
|---|---|---|---|
| 6,118,498 | A | 9/2000 | Reitmeier |
| 6,138,147 | A | 10/2000 | Weaver et al. |
| 6,222,482 | B1 | 4/2001 | Gueziec |
| 6,222,886 | B1 | 4/2001 | Yogeshwar |
| 6,266,817 | B1 | 7/2001 | Chaddha |
| 6,330,286 | B1 | 12/2001 | Lyons et al. |
| 6,418,473 | B1 | 7/2002 | St. Maurice et al. |
| 6,430,547 | B1 | 8/2002 | Busche et al. |
| 6,496,814 | B1 | 12/2002 | Busche |
| 6,505,106 | B1 | 1/2003 | Lawrence et al. |
| 6,564,262 | B1 | 5/2003 | Chaddha |
| 6,580,754 | B1 | 6/2003 | Wan et al. |
| 6,609,149 | B1 | 8/2003 | Bandera et al. |
| 6,615,133 | B2 | 9/2003 | Boies et al. |
| 6,721,952 | B1 | 4/2004 | Guedalia et al. |
| 6,728,965 | B1 | 4/2004 | Mao |
| 6,738,980 | B2 | 5/2004 | Lin et al. |
| 6,751,129 | B1 | 6/2004 | Gongwer |
| 6,751,626 | B2 | 6/2004 | Brown et al. |
| 6,766,245 | B2 | 7/2004 | Padmanabhan |
| 6,837,031 | B1 | 1/2005 | Hannen et al. |
| 6,842,724 | B1 | 1/2005 | Lou et al. |
| 6,856,759 | B1 | 2/2005 | Fukuda et al. |
| 6,898,246 | B2 | 5/2005 | Katayama |
| 6,985,188 | B1 | 1/2006 | Hurst, Jr. |
| 7,010,801 | B1 | 3/2006 | Jerding et al. |
| 7,051,170 | B2 | 5/2006 | Guo |
| 7,106,749 | B1 | 9/2006 | Darshan et al. |
| 7,158,531 | B2 | 1/2007 | Barton |
| 7,167,488 | B2 | 1/2007 | Taylor et al. |
| 7,219,145 | B2 | 5/2007 | Chmaytelli et al. |
| 7,334,044 | B1 | 2/2008 | Allen |
| 7,382,796 | B2 | 6/2008 | Haberman et al. |
| 7,409,456 | B2 | 8/2008 | Sitaraman |
| 7,430,222 | B2 | 9/2008 | Green |
| 7,443,791 | B2 | 10/2008 | Barrett et al. |
| 7,477,653 | B2 | 1/2009 | Smith |
| 7,523,482 | B2 | 4/2009 | Barrett et al. |
| 7,562,375 | B2 | 7/2009 | Barrett |
| 7,603,689 | B2 | 10/2009 | Baldwin |
| 2002/0002708 | A1 | 1/2002 | Arye |
| 2002/0024956 | A1 | 2/2002 | Keller-Tuberg |
| 2002/0031144 | A1 | 3/2002 | Barton |
| 2002/0040481 | A1 | 4/2002 | Okada et al. |
| 2002/0107968 | A1 | 8/2002 | Horn et al. |
| 2002/0108119 | A1 | 8/2002 | Mao et al. |
| 2002/0114331 | A1 | 8/2002 | Cheung et al. |
| 2002/0124258 | A1 | 9/2002 | Fritsch |
| 2002/0144276 | A1 | 10/2002 | Radford et al. |
| 2002/0147979 | A1 | 10/2002 | Corson |
| 2002/0147991 | A1 | 10/2002 | Furlan et al. |
| 2002/0170067 | A1 | 11/2002 | Norstrom et al. |
| 2003/0037331 | A1 | 2/2003 | Lee |
| 2003/0060196 | A1 | 3/2003 | Levinberg |
| 2003/0093801 | A1 | 5/2003 | Lin et al. |
| 2003/0106053 | A1 | 6/2003 | Sih et al. |
| 2003/0158899 | A1 | 8/2003 | Hughes |
| 2003/0159143 | A1 | 8/2003 | Chan |
| 2003/0202594 | A1 | 10/2003 | Lainema |
| 2003/0202775 | A1 | 10/2003 | Junkersfeld et al. |
| 2003/0223430 | A1 | 12/2003 | Lodha et al. |
| 2004/0003399 | A1 | 1/2004 | Cooper |
| 2004/0034863 | A1 | 2/2004 | Barrett et al. |
| 2004/0034864 | A1 | 2/2004 | Barrett et al. |
| 2004/0049793 | A1 | 3/2004 | Chou |
| 2004/0128694 | A1 | 7/2004 | Bantz et al. |
| 2004/0160971 | A1 | 8/2004 | Krause et al. |
| 2004/0160974 | A1 | 8/2004 | Read et al. |
| 2004/0255328 | A1 | 12/2004 | Baldwin et al. |
| 2005/0039214 | A1 | 2/2005 | Lorenz et al. |
| 2005/0071496 | A1 | 3/2005 | Singal et al. |
| 2005/0078680 | A1 | 4/2005 | Barrett et al. |
| 2005/0078757 | A1 | 4/2005 | Nohrden |
| 2005/0080904 | A1 | 4/2005 | Green |
| 2005/0081243 | A1 | 4/2005 | Barrett et al. |
| 2005/0081244 | A1 | 4/2005 | Barrett et al. |
| 2005/0081246 | A1 | 4/2005 | Barrett et al. |
| 2005/0128951 | A1 | 6/2005 | Chawla et al. |
| 2005/0154917 | A1 | 7/2005 | deCarmo |
| 2005/0172314 | A1 | 8/2005 | Krakora et al. |
| 2005/0190781 | A1 | 9/2005 | Green et al. |
| 2005/0240961 | A1 | 10/2005 | Jerding et al. |
| 2006/0117343 | A1 | 6/2006 | Novak et al. |
| 2006/0117358 | A1 | 6/2006 | Baldwin et al. |
| 2006/0117359 | A1 | 6/2006 | Baldwin et al. |
| 2006/0126667 | A1 | 6/2006 | Smith et al. |
| 2006/0251082 | A1 | 11/2006 | Grossman et al. |
| 2007/0113261 | A1 | 5/2007 | Roman et al. |

FOREIGN PATENT DOCUMENTS

| | | |
|---|---|---|
| EP | 0633694 A | 1/1995 |
| EP | 0633694 A1 | 1/1995 |
| EP | 1294193 A1 | 3/2003 |
| JP | 2001204035 | 7/2001 |
| JP | 2001516184 | 9/2001 |
| TW | 388182 | 4/2000 |
| WO | WO9806045 A1 | 2/1998 |
| WO | WO9909741 A1 | 2/1999 |
| WO | WO0009741 A1 | 2/2000 |
| WO | WO0103373 A1 | 1/2001 |
| WO | WO0126271 A1 | 4/2001 |
| WO | WO0156285 A1 | 8/2001 |
| WO | WO02087235 A1 | 10/2002 |
| WO | WO03088646 A2 | 10/2003 |
| WO | WO2004062291 A1 | 7/2004 |

OTHER PUBLICATIONS

Petit, et al., "Bandwidth Resource Optimization in Video-on-Demand Network Architectures", IEEE 1994, pp. 91-97.

State, et al., "Active Network Based Management for QoS Assured Multicast Delivered Media", Joint 4th IEEE Int'l Conf. on ATM and High Speed Intelligent Internet Symposium, Apr. 2001, pp. 123-127.

Ding, et al., "Resource-Based Striping: An Efficient Striping Strategy for Video Servers Using Heterogeneous Disk-Subsystems", Multimedia Tools and Applications, vol. 19. No. 1, Jan. 2003, pp. 29-51.

Gonzalaez, et al., "Load Sharing Based on Popularity in Distributed Video on Demand Systems", Proceedings 2002 IEEE Int'l Conf. on Multimedia and Expo, vol. 1,, Aug. 2002, pp. 423-434.

Lee, "Staggered Push-A Linearly Scalable Architecture for Push-Based Parallel Video Servers", IEEE Transactions on Multimedia, vol. 4, No. 4, Dec. 2002, pp. 423-434.

Lo, et al., "Deploy Multimedia-on-Demand Services over ADSL Networks", PCM 2002; Lecture Notes in Computer Science, vol. 2532, Dec. 2002, pp. 295-302.

Song, et al., "Replica Striping for Multi-Resolution Video Servers", IDMS/PROMS 2002; Lecture Notes in Computer Science, vol. 2515, No. 2002, pp. 300-312.

"Digital Headend Solutions; Tune in to Digital TV", retrieved from the Internet on Nov. 3, 2005, Available at <<http://www.tutsystems.com/digitalheadend/solutions/index.cfm>>, 1 page.

"Infovalue Experts: Info Value Unveils Industry's First Video Multicasting Solution with Instant Replay", retrieved from the Internet on Nov. 3, 2005, Available at <<http:/www.infovalue.com/links/news%20room/press%20releases/1999/Press_%20First_Multicasting_with_Instant_Replay.pdf>>, 3 pages.

MediaFLO; Introducing FLO Technology:, retrieved from the Internet on Nov. 3, 2005, available at <<http://www.quatcomm.com/mediaflo/news/pdf/flo_whitepaper.pdf>>, pp. 1-8.

"Optibase MGW 2400", retrieved from the Internet Nov. 3, 2005, Available at <<http://www.epecomgraphics.com/optibase_mgw2400_features.html>>, 2 pages.

"QuickTime streaming your Media in Real Time", retrieved from the Internet on Nov. 3, 2005, Accessible at <<http://www.apple.com.tw/quicktime/technologies/streaming/>>, 3 pages.

BenAbdelkader, et al., "Combining Holistic and Parametric Approaches for Gait Recognition," Submitted to IEEE Transactions on Pattern Analysis and Machine Intelligence, Dec. 2002, 37 pages.

BenAbdelkader, et al., "Person Identification Using Automatic Height and Stride Estimation," IEEE Intenational Conference on Pattern Recognition, Aug. 11, 2002-Aug. 15, 2002, pp. 1-4.

BenAbdelkader, et al., "Stride and Cadence as a Biometric in Automatic Person Identification and verification," 5th International Conference on Automatic Face and Gesture Recognition, May 20, 2002, pp. 1-6.

BenAbdelkader, et al., "View-invariant Estimation of Height and Stride for Gait Recognition", Workshop on Biometric Authentication (BIOMET), in association with ECCV 2002, Jun. 1, 2002, 12 pages.

BenAbdelkader, et al., "EigenGait: Motion-based Recognition of People Using Image Self-similarity,"Proc. Intl. on Audio and Video-based Person Authentication (AVBPA), 2001, 11 pages.

BenAbdelkader, et al., "Motion-based Recognition of People in Elgengait Space", 5th International Conference on Automatic Face and Gesture Recognition, May 20, 2002, pp. 1-6.

Cutler, et al., "Robust Real-Time Periodic Motion Detection, Analysis, and Applications", IEEE Transactions on Pattern Analysis and Machine Intelligence (PAMI), vol. 22, No. 8, Aug. 2000.

Elgammal, et al., "Non-Parametric Model for Background Substraction", IEEE ICCV99 Frame Rate Workshop, IEEE 7th International Conference on Computer Vision, Kerkyra, Greeca, Sep. 1999, pp. 1-17.

Tsai, R., "An Efficient and Accurate Camera Calibration Technique for 3d Machine Vision", Proceedings of the Computer Vision and Pattern Recognition, 1986, pp. 364-374.

Turk, et al., "Face Recognition Using Eigenfaces," CVPR, 1991, pp. 586-591.

Haritaoglu, et al., "W4S: A Real-Time System for Detecting and Tracking People in 2 1/2 D", In European Conference on Computer Vision, 1998, 16 pages.

Zhou, et al., "On-line Scene Change Detection of Multicast (MBone) Video", Proceedings of the SPIE-The International Society for Optical Engineering, Nov. 1998, vol. 3527, pp. 271-282.

Wu, et al., "Scalable Video Coding and Transport over Broad-Band Wireless Networks", Proceedings of the IEEE, Jan. 2001, vol. 89, No. 1. pp. 6-20.

Wee, et al., "Splicing MPEG Video Streams in the Compressed Domain", IEEE 1997, pp. 224-230.

Gil, et al., "Simulation of a Mobility Prediction Scheme Based on Neuro-Fuzzy Theory in Mobile Computing", Simulation, Jul. 2000, vol. 75, No. 1, pp. 6-17.

"Multidimensional Database Technology", Computer, Dec. 2001, vol. 34, No. 12, pp. 40-46.

Wolfson, et al., "Modeling Moving objects for Location Based Services", Lectures Notes in Computer Science, 2002, vol. 2538, pp. 46-58.

Zhang, et al., "Data Modeling of Moving Objects with GPS/GIS in Web Environment", International Conference on Communications, Circuits and Systems and West Sino Exposition Proceedings, 2002, vol. 2 pp. 1581-1585.

Zhang, et al., "The Cost Model of Moving Objects Communication with GPS", International Conference on Communications, Circuits and Systems and West Sino Exposition Proceedings, 2002, vol. 2, pp. 1576-1580.

Armitage, "Support for Multicast over UNI 3.0/3.1 based ATM Networks", RFC 2022, Standards Track, Nov. 1996, pp. 1-82.

Halvorsen, et al., "Q-L/MRP: A Buffer Muffer Management Mechanism for QoS Support in a Multimedia DBMS", IEEE 1998, pp. 162-171.

Hurst, et al., "MPEG Splicing: A New Standard for Television-SMPTE 312M", SMPTE Journal, Nov. 1998, pp. 978-988.

Kamlyama, et al., "Renegotiated CBR Transmission in Interactive Video-on-Demand System", IEEE 1997, pp. 12-19..

Lu, et al., "Experience in designing a TCP/IP based VOD system over a dedicated network", IEEE 1997, pp. 262-266.

EP Patent Application 03016242.4; Search Report dated Jan. 29, 2004.

EP Patent Application 03016242.4; Examination Report dated Jul. 10, 2008.

JP Patent Application 2003-293004; First Office Action dated Jul. 17, 2009 (English translation).

JP Patent Application 2003-293004; Second Office Action dated Jun. 25, 2010 (English translation).

JP Patent Application 2003-293004; Final Office Action dated Dec. 21, 2010 (English translation).

CN Patent Application 03154051.1; First Office Action dated Mar. 9, 2007 (English translation).

CN Patent Application 03154051.1; Second Office Action dated Feb. 29, 2008 (English translation).

Patent Application 03154051.1; Third Office Action dated Jun. 6, 2008 (English translation).

SEAMLESS DIGITAL CHANNEL CHANGING

CROSS-REFERENCE TO RELATED APPLICATIONS

This application is a continuation of U.S. patent application Ser. No. 10/218,675, entitled "SEAMLESS DIGITAL CHANNEL CHANGING" and filed on Aug. 13, 2002, the entire contents of which is hereby incorporated by reference.

TECHNICAL FIELD

This disclosure relates in general to changing channels in a digital video environment and in particular, by way of example but not limitation, to reducing the waterfall effect when changing from one video stream to another video stream in a digital network.

BACKGROUND

Television-based entertainment systems are expanding the programming and services that they offer. In addition to television programming content such as that found on broadcast and traditional cable networks, television service providers are adding on-demand video, as well as other interactive services, features, and applications. The existence of these specific services, features, and applications, as well as the continuing increase in the breadth of available general programming content, drives the adoption of digital network technology for television-based entertainment systems.

Digital technology enables satellite and cable operators to increase the number and kinds of services that they offer to subscribers and thus their average revenue per subscriber. Unfortunately, although digital technology offers many advantages to subscribers as compared to traditional analog networks, it also has a number of drawbacks. For example, changing channels in many digital television services results in a "waterfall effect" in which the image of the new channel is gradually displayed from top to bottom over two to three seconds. This visually-dominating, channel-changing waterfall effect provides a less crisp viewing experience and frustrates users of such digital television services.

This and other drawbacks of digital technology lead to higher rates of subscriber churn, which means that a large percentage of subscribers that try digital television service switch back to traditional analog service within a short time period. Switching subscribers from analog to digital service involves expenditures for network operators that range from broad, general marketing costs down to individual incentives and installation expenses. Consequently, reducing subscriber churn can financially benefit satellite and cable operators.

Accordingly, for television-based entertainment systems, there is a need for schemes and techniques to reduce the churn out of digital service and back to traditional analog service that results from subscribers being dissatisfied with the waterfall effect that occurs during channel changing in many digital television services.

SUMMARY

Seamless channel changing in a digital-television-based entertainment network can be implemented, for example, by providing an intra frame to a client device upon a change to a new channel even when the broadcast video data is previously compressed. In an exemplary implementation, a method includes: receiving a stream of broadcast video data that is encoded; continuously decoding the stream of broadcast video data into successive decoded images; and transmitting, responsive to a channel change message received from a client device, an intra frame that has been encoded from a decoded image of the successive decoded images.

In another exemplary implementation, a system includes: a receiver to receive a message that relates to a change to a new channel from a client device; a decoder to decode a broadcast video stream into decoded images; an encoder that is capable of encoding at least one of the decoded images into a complete frame; and a transmitter that is capable of transmitting the complete frame to the client device; wherein the transmitter transmits the complete frame for the new channel responsive to receipt of the message that relates to the change to the new channel from the client device.

Other method, system, and arrangement implementations are described herein.

BRIEF DESCRIPTION OF THE DRAWINGS

The same numbers are used throughout the drawings to reference like and/or corresponding aspects, features, and components.

DETAILED DESCRIPTION

Exemplary Television-Based Entertainment Network

Figure 1:
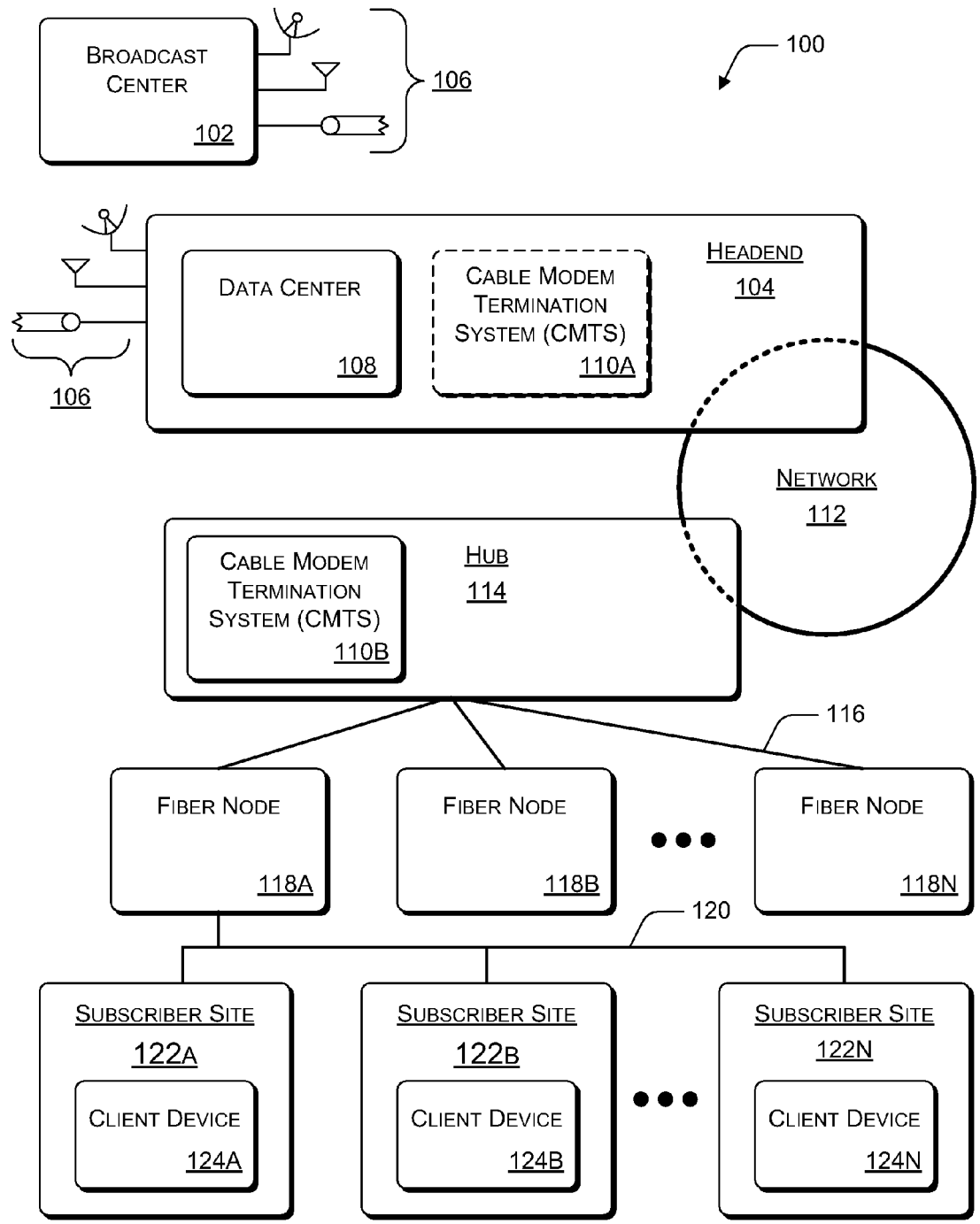
FIG. 1 illustrates an exemplary broadcast video distribution architecture in which the systems and methods for digital channel changing can be implemented.

FIG. 1 illustrates an exemplary broadcast video distribution architecture 100 in which the systems and methods for fast digital channel changing can be implemented. One or more broadcast centers 102 provide broadcast video to one or more headends 104 via one or more transmission media 106. Each broadcast center 102 and headend 104 is capable of interfacing with one or more transmission media 106 such as a satellite transmission medium, a radio frequency over-the-air transmission medium, a cable medium, and so forth. Hence, broadcast center 102 may be related to a satellite operator, a network television operator, a cable operator, and so forth.

Headend 104 includes at least one data center 108 that records the broadcast video that is received via transmission media 106 or any other media. The recording can be effectuated while the broadcast video is in a compressed data format, for example, in order to facilitate the ongoing storage of such broadcast video over days, weeks, or even indefinitely. The compression format may comport with a Moving Pictures Expert Group (MPEG) algorithm, such as MPEG-2, MPEG-4, and so forth. Other compression technologies may alternatively be employed, such as Microsoft Windows® Media, Advanced Simple Profile (ASP), Cintak, and so forth.

Headend 104 and a hub 114 may communicate across a network 112. Network 112 can be a fiber ring and may operate under a packet-based protocol, such as an Internet protocol (IP), IP over asynchronous transfer mode (ATM), and so forth. Packets can therefore be communicated between headend 104 and hub Hub 114 may include a cable modem termination system (CMTS) 110B for terminating communications from downstream cable modems. If hub 114 (or another un-illustrated hub) does not include CMTS 110B, headend 104 may include a CMTS 110A for terminating the cable modem communications. Although only one hub 114 is illustrated in architecture 100, headend 104 may provide broadcast video to multiple ones of such hubs 114 via network 112. Headend 104 thus distributes broadcast video over network 112 to one or more hubs 114.

Hub 114 distributes the broadcast video over fiber lines 116 to one or more fiber nodes 118A, 118B ... 118N. Each fiber node 118 outputs one or more coaxial lines 120, and each such coaxial line 120 includes coaxial line drops to multiple subscriber sites 122A, 122B ... 122N. Subscriber sites 122A, 122B ... 122N include client devices 124A, 124B ... 124N, respectively. Subscriber sites 122 may be homes, businesses, and so forth. Each subscriber site 122 may have multiple such client devices 124 that are each directly or indirectly interfacing with one or more of coaxial lines 120. Client devices 124 may be computers, set-top boxes of varying capabilities, hand-held/portable electronic devices, digital televisions, and so forth. Each client device 124 may include an integrated video screen or may be coupled to a video screen. An exemplary implementation of a client device 124 is described below with reference to FIG. 4.

Figure 2:
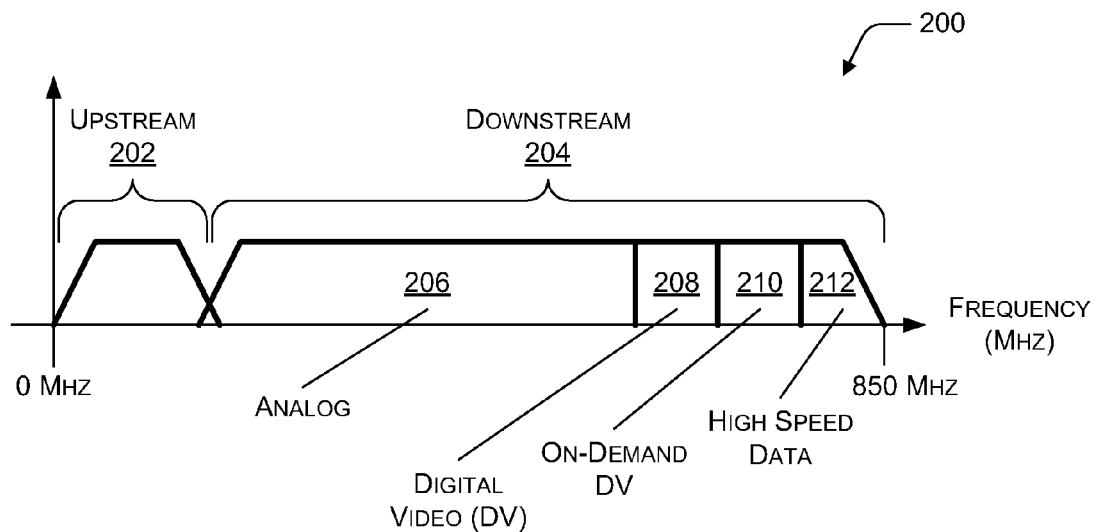
FIG. 2 illustrates an exemplary broadcast video distribution spectrum.

FIG. 2 illustrates an exemplary broadcast video distribution spectrum 200. Spectrum 200 extends from 0 Mhz to 850 Mhz and includes an upstream portion 202 and a downstream portion 204. Upstream portion 202 is allocated for communications from client devices 124 (of FIG. 1) to headend 104 for on-demand video requests, cable modem requests, channel changing requests, and so forth. Downstream portion 204 is allocated for communications from headend 104 to client devices 124. These downstream communications include analog (video) portion 206, digital video (DV) portion 208, on-demand DV portion 210, and high speed data portion 212.

Analog portion 206 typically includes some number of 6 Mhz analog channels. DV portion 208 also includes some number of 6 Mhz channels, but these are dedicated to DV. Each of these 6 Mhz channels can carry multiple DV channels in a compressed format, such as eight (8) regular definition video channels. Although analog downstream communications do typically occupy a predominant fraction of downstream portion 204, spectrum 200 is not necessarily illustrated to scale.

On-demand DV portion 210 is dedicated to providing video in a digital format on request. Hence, this resource can be dynamically allocated among multiple client devices 124. High speed data portion 212 includes data that is transmitted to client devices 124, such as data that is forwarded to client devices 124 in response to previous requests by cable modems thereof using upstream portion 202. Such data may include information that originated from the Internet or similar sources. Other distributions/allocations of spectrum 200 may alternatively be employed. Regardless, it should be understood that the term "digital network" may refer to a digital portion of a combination digital and analog network, depending on the spectrum allocation.

In order for a subscriber to have access to the video, features, and other services provided through the digitally-allocated portion of spectrum 200, the subscriber needs to have subscribed to digital services. The subscriber then uses a client device 124 that is capable of interpreting, decoding, and displaying digital video. The digital video usually provides a picture that is superior to that of analog video, and the digital services are often convenient, informative, and otherwise enjoyable. Nevertheless, a large percentage of new digital subscribers churn out of the digital service because of one or more of the drawbacks of digital service. One such drawback is the lag time when changing to a digital channel, whether the change is from an analog channel or from another digital channel.

Specifically, changing television channels on a digital network takes longer than changing channels on a traditional analog network. When a viewer of analog television is "surfing" through analog channels, the viewer can switch to a new analog channel from a previous analog channel (or a previous digital channel) without experiencing a delay that is sufficiently long so as to be annoying or perhaps even detectable to the viewer. In fact, the delay is usually less than 250 milliseconds in an analog network. However, when a viewer of digital television is "surfing" through digital channels, the delay between when a new digital channel is requested and when the video of the new digital channel is displayed is detectable. Furthermore, the delay is sufficiently long so as to be annoying and even frustrating to the viewer.

Existing Digital Channel Tuning Time Approach

Figure 3:
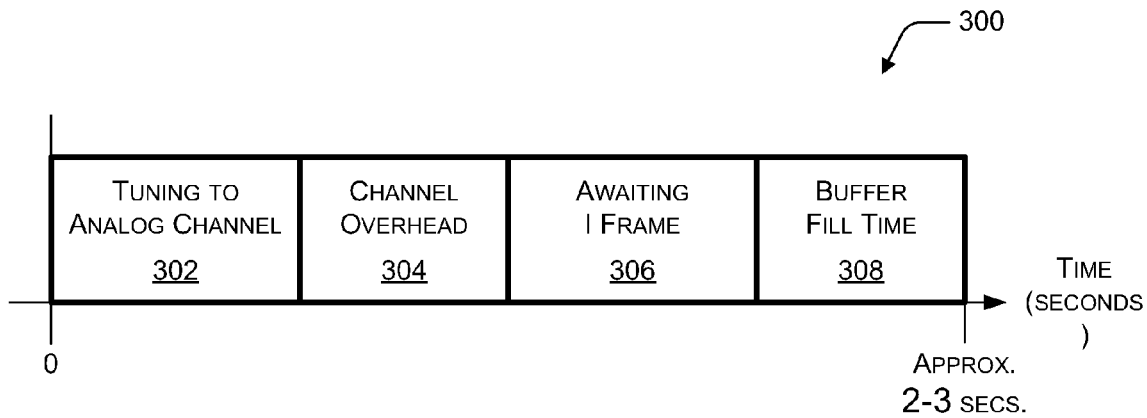
FIG. 3 illustrates a tuning time for a digital channel in accordance with a conventional approach.

FIG. 3 illustrates a tuning time 300 for a digital channel in accordance with a conventional approach. Tuning time 300 includes four (4) delay periods: tuning to analog channel delay 302, channel overhead delay 304, awaiting an I frame delay 306, and a buffer fill time delay 308. The digital video channels are located at specific frequencies along spectrum 200 (of FIG. 2) in groups such as 6-8 digital channels per 6 Mhz frequency. Consequently, there is an analog tune time delay 302 that elapses while tuning to the appropriate 6 Mhz slot. Especially because there are multiple digital channels per 6 Mhz channel, there is a channel overhead delay 304 that accounts for the vagaries of acquiring the underlying compressed video stream transport, such as an MPEG-2 stream.

When digital video data is transmitted as an MPEG stream, for example, the data is communicated as a series of frames. These frames are either intra frames (I frames) or non-intra frames (non-I frames), with non-I frames including predicted frames (P frames) and bi-directional frames (B frames). I frames are individual stand-alone images that may be decoded without reference to other images (either previous or subsequent). P frames are predicted forward in time; in other words, P frames only depend on a previous image. B frames, on the other hand, can be predicted forward and/or reverse in time.

Because only I frames stand alone in the data stream as reference frames, decoding of an MPEG or similarly constituted data stream needs to start at an I frame. I frames in MPEG-2 data streams for a standard definition digital television channel can arrive as infrequently as every two seconds. Assuming that channel change requests arrive on average somewhere in the middle between two I frames, the average delay time due to waiting for an I frame 306 is approximately one (1) second.

After an I frame is acquired, succeeding (non-I) frames are needed to continue the video presentation. These succeeding frames are applied to a decoding buffer until the decoding buffer is full. More particularly for an MPEG-based decoding process, decoding is not commenced in a broadcast environment until there are a sufficient number of frames in the decoding buffer to ensure that the buffer will not be emptied by the decoding process faster than it is being replenished. Hence, there is an additional delay corresponding to a buffer fill time 308. A typical buffer fill time 308 can last 500-750 milliseconds. These four (4) delay periods 302, 304, 306, and 308 of tuning time 300 can total approximately 2-3 seconds, which is a noticeable and annoyingly lengthy time period when channel "surfing".

There are also similar delays in television-based entertainment networks that utilize macroblocks instead of frames for the I, P, and B units of the video data that are compressed, for example, in accordance with an MPEG-based algorithm. In such networks, I macroblocks, P macroblocks, and B macroblocks are analogous to the I frames, P frames, and B frames. The various macroblocks are amalgamated to form images of the video. In fact, in a conventional digital channel changing environment for a cable network, the amalgamation is visible as the I macroblocks for an image are received, decoded, and displayed on a screen. The display of the decoded I macroblocks is reminiscent of a waterfall inasmuch as the decoded I macroblocks appear first toward the top portion of the screen and gradually fill in the remainder of the screen, generally from the top to the bottom.

Exemplary Approach(es) to Fast Digital Channel Changing

Figure 4:
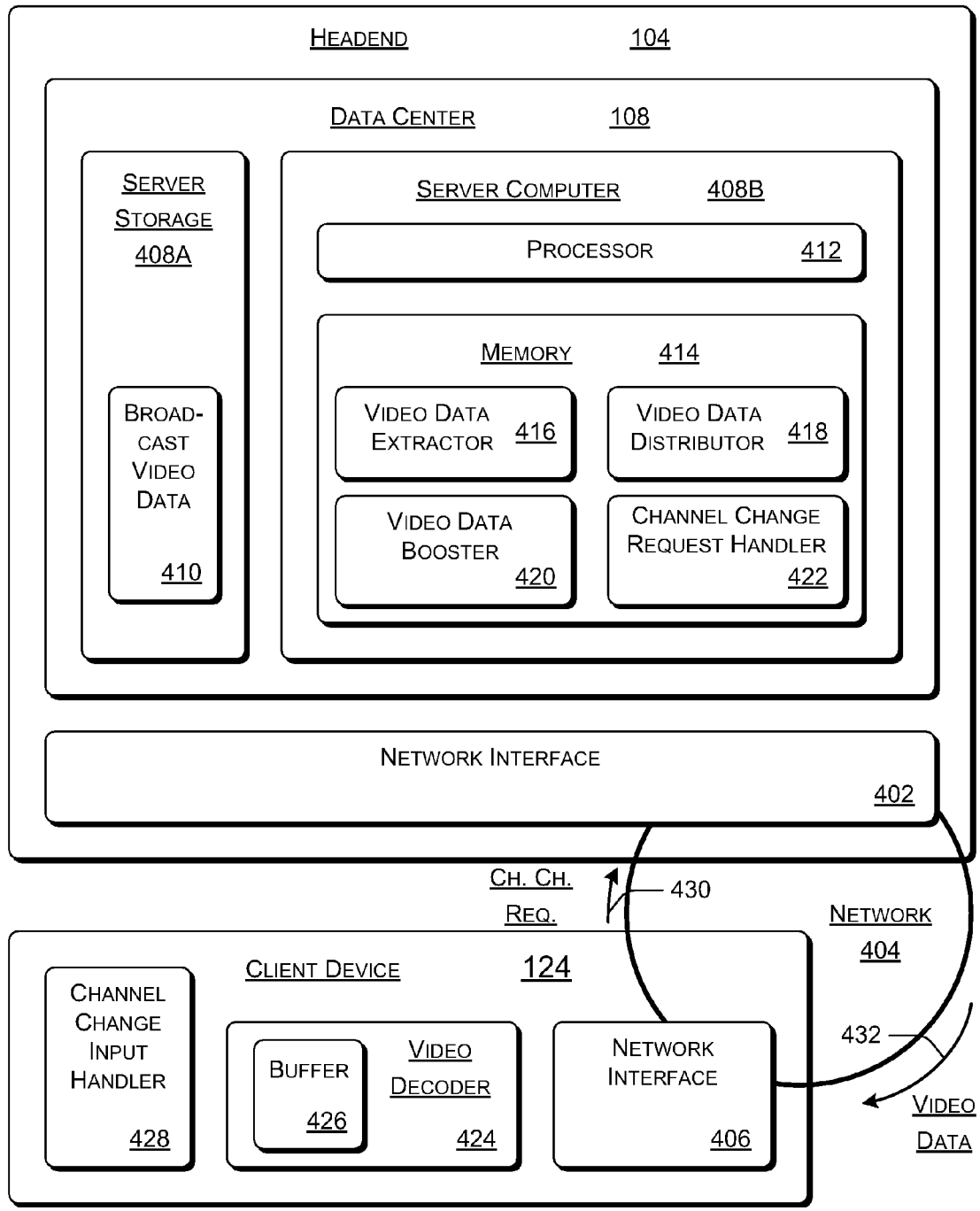
FIG. 4 illustrates an exemplary headend and an exemplary client device in which the systems and methods for fast digital channel changing can be implemented.

FIG. 4 illustrates an exemplary headend 104 and an exemplary client device 124 in which the systems and methods for fast digital channel changing can be implemented. Headend 104 uses a network interface 402 to communicate over a network 404, and client device 124 used a network interface 406 to communicate over network 404. Network 404 can be any two-way unicast network. For example, network 404 may enable the establishment of point to point Internet protocol (IP) sessions thereon. Alternatively, network 404 may be a video on demand (VOD) type network, a video over digital subscriber line (DSL)-based network, and so forth. Other implementations for network 404 may also be employed.

Network 404 may include one or more other nodes that are upstream of client device 124 in addition to headend 104. For example, hubs 114 (of FIG. 1) and fiber nodes 118 may be located between client device 124 and headend 104 for forwarding/routing packets or other communications therebetween. Additionally, network 404 may be realized as a combination of networks.

Network interfaces 402 and 406 may vary depending on the architecture of network 404. In an exemplary cable network implementation, network interface 402 includes a CMTS (such as CMTS 110A) if there is no other intervening CMTS 110 in network 404, and network interface 406 includes a cable modem. Network interface 402 and/or network interface 406 may also include components for interacting with an IP network, a DSL network, and so forth. These components may include a receiver, a transmitter, a transceiver, etc. that are adapted to interact with the appropriate network.

In an exemplary described implementation, broadcast video distribution from headend 104 to client device 124 is effectuated generally as follows. A point to point IP session is established between headend 104 and client device 124. Broadcast video data 432 for a specific channel is streamed to client device 124 across network 404. Thus, each client device 124 receives its own designated broadcast video data stream according to its corresponding requested channel. As a consequence, each fiber node 118 (of FIG. 1), if present, has a different current allocation of the two-way portion of the network that is intended for downstream transmissions to client devices 124. This two-way spectrum portion may correspond to DV portion 208 (of FIG. 2).

Using point to point IP sessions eliminates the analog tune time, as well as the channel overhead delay, because there is no analog tuning to a designated frequency channel. Client devices 124 are "tuned" to an IP data source such that the digital "tuning" between channels occurs in the IP domain at headend 104. When changing from a first channel to a second channel, an IP switch (not shown) at headend 104 notes that an IP address of client device 124 is now designated to receive a broadcast video data stream that corresponds to the second channel. Although the analog channel tuning time delay is eliminated, a new delay is introduced as a result of the two-way communication between client device 124 and headend 104. This new delay is described further below.

Client device 124 includes a channel change input handler 428, a video decoder 424, and network interface 406. Video decoder 424 includes a buffer 426 for storing received broadcast video data prior to decoding. Channel change input handler 428 receives a channel change input from a user (not shown) that orders a change to a requested channel. The channel change input may be received from a remote control, a keyboard, a personal digital assistant (PDA) or similar, a touch-sensitive screen, integrated keys, and so forth.

Channel change input handler 428 may be realized as executable instructions and/or hardware, software, firmware, or some combination thereof. Channel change input handler 428 constructs a channel change request 430 in packet form that includes an indicator of the requested channel. Channel change request 430 is provided from channel change input handler 428 to network interface 406 of client device 124 for transmission over network 404.

Network interface 402 of headend 104 receives channel change request 430 via network 404. Network interface 402 provides channel change request 430 to data center 108. Data center 108, in an exemplary implementation, includes a server architecture 408. Server architecture 408 includes a server storage 408A and a server computer 408B. Server storage 408A includes a storage device (not explicitly shown) that comprises mass memory storage, such as a disk-based storage device. Examples of suitable disk-based storage devices/systems include a redundant array of independent/inexpensive disks (RAID), a Fibre Channel storage device, and so forth.

Server storage 408A stores broadcast video data 410. Broadcast video data is broadcast (e.g., from broadcast center 102 (of FIG. 1)) to headend 104 in a compressed format. In an exemplary described implementation, the compressed format comprises a digital stream in accordance with an MPEG protocol, such as MPEG-4. However, other compression formats may alternatively be used. As the compressed digital stream arrives at headend 104, it is stored as broadcast video data 410. Thus, server storage 408A retains broadcast video data 410 in a compressed digital format. Server storage 408A may retain broadcast video data 410 for multiple channels as it is received over hours, days, weeks, and even essentially perpetually.

Server computer 408B enables access to the retained broadcast video data 410 of server storage 408A. Server computer 408B includes one or more processors 412 and one or more memories 414. Although not shown, server computer 408B may also include other components such as input/output interfaces; a local disk drive; hardware and/or software for encoding, decoding, and otherwise manipulating video data, and so forth. Memory 414 may include a non-volatile memory such as disk drive(s) or flash memory and/or volatile memory such as random access memory (RAM). In an exemplary described implementation, memory 414 includes electronically-executable instructions.

Specifically, memory 414 includes the following electronically-executable instructions: a channel change request handler 422, a video data extractor 416, a video data booster 420, and a video data distributor 418. The electronically-executable instructions of memory 414 may be executed on processor 412 to effectuate functions as described below. In alternative implementations, one or more of channel change request handler 422, video data extractor 416, video data booster 420, and video data distributor 418 may be stored in a memory such that they are hardware encoded for automatic execution and/or for faster execution by a processor 412.

Network interface 402 forwards channel change request 430 to channel change request handler 422. Channel change request handler 422 isolates the requested channel from channel change request 430 and provides the requested channel to video data extractor 416. Video data extractor 416 is responsible, at least partially, for extracting broadcast video data for the requested channel from broadcast video data 410 of server storage 408A. Video data extractor 416 compensates for channel change requests 430 that arrive in between two intra frames by ensuring that the tuning actually takes place at a more opportune time.

In other words, to avoid having to wait for an I frame, the broadcast video data delivery is backed up in time into the past. The delivery of broadcast video data 410 to client device 124 for the requested channel is offset in time behind a current broadcast time of the requested channel. Consequently, the viewer at client device 124 is presented with broadcast video that is prior to a current broadcast time and thus not current, but video presentation lag times during channel "surfing" are reduced.

Figure 5:
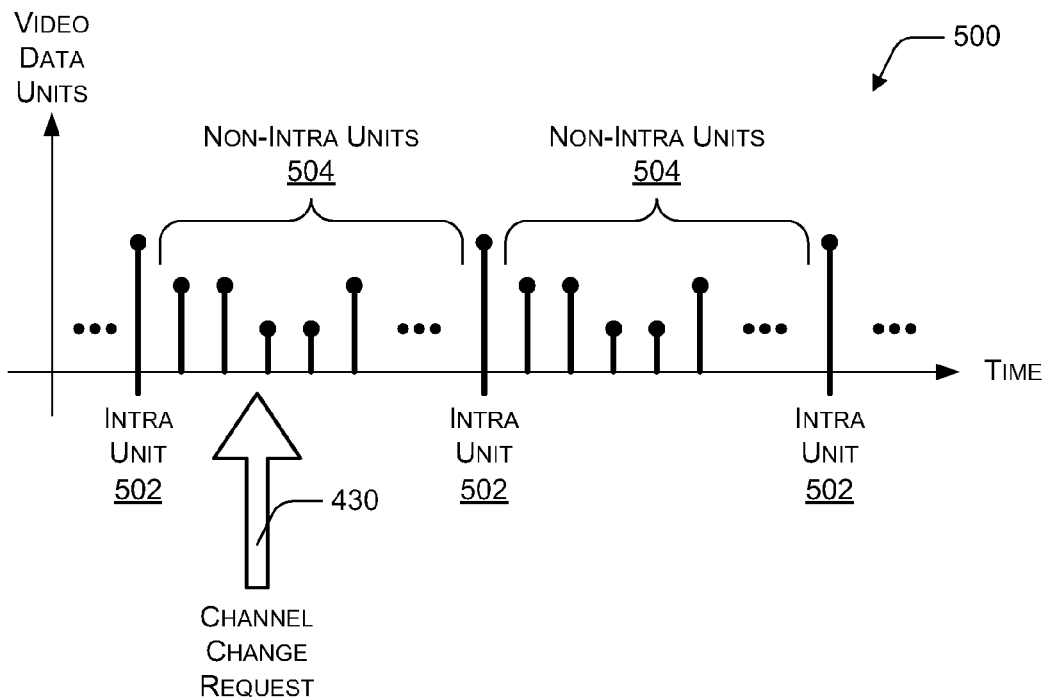
FIG. 5 illustrates an exemplary data stream for compressed video.

FIG. 5 illustrates an exemplary data stream 500 for compressed video. Data stream 500 is graphed with video data units rising upward parallel to the ordinate axis and with time increasing in the rightward direction along the abscissa axis. Generally, video data units of data stream 500 comprise units of compressed video images. Specifically, these units may correspond to frames, (macro)blocks, and so forth of a video compression protocol such as MPEG. Data stream 500 includes intra units (I units) 502 and non-intra units (non-I units) 504.

In exemplary described implementations, I units 502 may correspond to I frames, I macroblocks, and so forth. Non-I units 504 may correspond to P frames, P macroblocks, B frames, B macroblocks, and so forth. Thus, I units 502 may in general be decoded without reference to other units, regardless of the relevant compression algorithm. In other words, an intra unit may refer to any data segment that may be decoded and subsequently displayed without reference to any other data segment, regardless of whether the data segment is compressed in accordance with MPEG in particular or any other coding algorithm in general. Similarly, a complete or intra frame may refer to any data frame that may be decoded and subsequently displayed without reference to any other data frame and that completely fills a designated image area. Such a designated image area may correspond to a full screen, the entirety of any allocated video display space, a full window, and so forth.

I units 502 and non-I units 504 for each digital video channel are received at headend 104 (of FIG. 4) from broadcast center 102 (of FIG. 1) and stored as broadcast video data 410 at server storage 408A over time. Broadcast video data 410 is thus retained at data center 108, and it is available for immediate or subsequent streaming to client devices 124.

I units 502 arrive from time to time, such as at approximate intervals or every predetermined period, along data stream 500 at headend 104. In between I units 502, a multiple of non-I units 504 arrive along data stream 500. Usually, channel change requests 430 arrive at headend 104 from client devices 124 at times in between two I units 502. Waiting for the next I unit 502 to arrive before beginning video decoding adds, on average, one second of delay to the digital channel tuning time for an MPEG-2 stream. As video decoders evolve and become more bandwidth efficient, this average delay time due to waiting for the next I unit 502 can stretch to five (5) or more seconds.

However, instead of waiting for the arrival of the next I unit 502, video data extractor 416 (of FIG. 4) seeks backward in time and retrieves a previous I unit 502. This previous I unit 502 is, in some implementations, the most-recently-received I unit 502. However, any previous I unit 502 may alternatively be sought and/or retrieved. For example, if there are an insufficient number of intervening non-I units 504 between a most-recently-received I unit 502 and the time at which a channel change request 430 is received, then the second most-recently-received I unit 502 may be sought and retrieved. The sufficiency of the number of intervening non-I units 504 is determinable responsive to the size of buffer 426 of client device 124. This buffer 426 may be filled with the intervening non-I units 504; this optional buffer filling is described further below with reference to video data booster 420.

In other words, video data extractor 416 accesses server storage 408A to retrieve an I unit 502 of broadcast video data 410 that is in the past with respect to a current broadcast time. Specifically, video data extractor 416 accesses a portion of broadcast video data 410 that corresponds to the requested channel of channel change request 430. Video data extractor 416 seeks backward in time (e.g., to the left of channel change request 430 along data stream 500) to locate and then retrieve the most recently received I unit 502 for the requested channel. This I unit 502 is provided to video data distributor 418.

With respect to possible buffer fill time delays, channel changing delays due to a buffer fill time of buffer 426 can be avoided or reduced with video data booster 420. Video data booster 420 receives the requested channel information from channel change request handler 422 or video data extractor 416. Video data booster 420 also receives from video data extractor 416 the location along data stream 500 of the retrieved (e.g., the most-recently-received) I unit 502. Video data booster 420 retrieves a number of immediately-succeeding non-I units 504 from along data stream 500. The number of non-I units 504 are sufficient in size so as to fill buffer 426 of video decoder 424.

Specifically, video data booster 420 accesses stored broadcast video data 410 of server storage 408A at a location that corresponds to the requested channel. Video data booster 420 is aware of the size of buffer 426 of client device 124. Video data booster 420 may be informed of the size requirements of buffer 426 by an operator of headend 104, by client device 124, and so forth. Client device 124 may inform video data booster 420 of this buffer size when client device 124 is connected to network 404, when a point to point session is established, with channel change request 430, and so forth.

Although the physical or allocated size of an actual buffer for video decoder 424 may be of any size, buffer 426 refers to a minimum level or amount of coded broadcast video data that is necessary or preferred to be in reserve when decoding commences. This minimum level or amount may depend on the particular compression/decompression technology employed, and buffer 426 may correspond to any such minimum size or larger. For an exemplary MPEG-2 coding implementation, buffer 426 corresponds to approximately 500 kilobytes. For an exemplary MPEG-4 coding implementation, buffer 426 corresponds to approximately four (4) megabytes. Video data booster 420 thus retrieves non-I units 504, which follow the most-recently-received I unit 502, to a size that is sufficient to fill buffer 426. This retrieval is performed at a boost rate that exceeds the streaming rate for data stream 500. This buffer 426-sized set of non-I units 504 is provided to video data distributor 418.

Consequently, video data distributor 418 accepts the most-recently-received unit 502 from video data extractor 416 and the multiple non-I units 504 from video data booster 420. Video data distributor 418 provides the most-recently-received I unit 502 and the multiple non-I units 504 of broadcast video data to network interface 402. Network interface 402 transmits the broadcast video data over network 404 as video data packet(s) 432. Client device 124 receives the video data packet(s) 432 via network 404 at network interface 406.

Video data distributor 418 orchestrates the broadcast video data distribution in any desired order. For example, the most-recently-received I unit 502 and the multiple non-I units 504 may be collected at video data distributor 418 and jointly transmitted. Also, the most-recently-received I unit 502 may be transmitted under the control of video data distributor 418 while video data booster 420 is retrieving the multiple non-I units 504 from broadcast video data 410. Other distributions may alternatively be employed.

It should be noted that the electronically-executed instructions of channel change request handler 422, video data extractor 416, video data booster 420, and video data distributor 418 may be combined or otherwise alternatively organized. For example, the electronically-executed instructions of video data distributor 418 may be incorporated into video data extractor 416 and/or video data booster 420.

After network interface 406 of client device 124 receives the broadcast video data for the requested channel, network interface 406 forwards the most-recently-received I unit 502 and the multiple non-I units 504 that follow thereafter of the broadcast video data to video decoder 424. Video decoder 424 decodes the most-recently-received I unit 502 in preparation for rendering the video image on a screen. Video decoder 424 places the multiple non-I units 504 into buffer 426 for subsequent decoding and video presentation on the screen.

Buffer 426 may be realized as a dedicated and/or specialized memory, as part of a memory that is shared for other purposes, and so forth. Although not shown, client device 124 may also include other components and/or executable instructions, such as an operating system, analog tuners, non-volatile memory storage, RAM, audio/video outputs, one or more specialized and/or general-purpose processors, and so forth.

Figure 6:
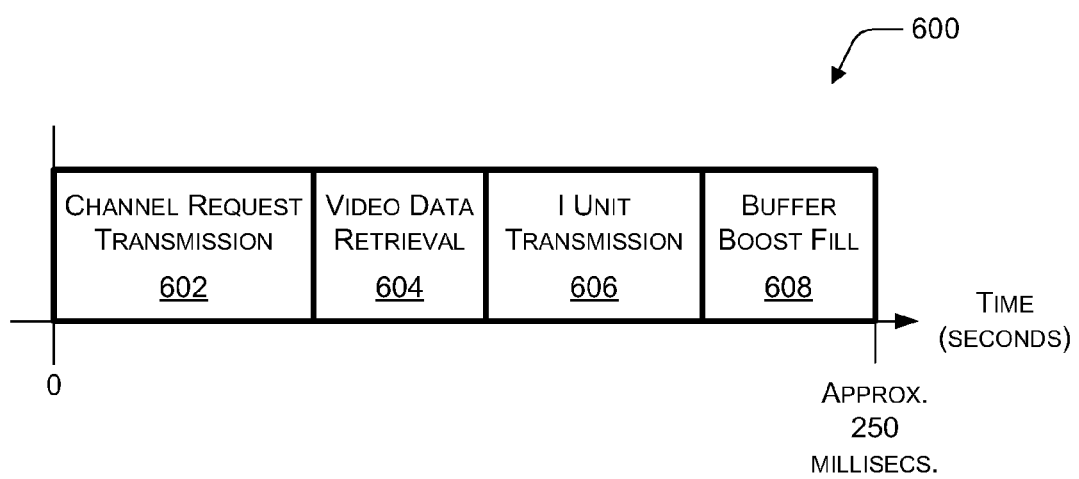
FIG. 6 illustrates a fast tuning time for a digital channel as described herein.

FIG. 6 illustrates a fast tuning time 600 for a digital channel as described herein. Generally, delays for tuning to an analog channel, for channel overhead, and for waiting for an I frame are eliminated. The traditional buffer fill time is also at least reduced. However, new delays are introduced. Specifically, fast tuning time 600 includes four (4) delay periods: channel request transmission delay 602, video data retrieval delay 604, 1 unit transmission delay 606, and buffer boost fill delay 608.

Channel request transmission delay 602 reflects the time for channel change request 430 to be formulated in client device 124 and transmitted to headend 104 across network 404. Video data retrieval delay 604 reflects the time that elapses while server computer 408B retrieves the most-recently-received I unit 502. I unit transmission delay 606 reflects the time for the most-recently-received I unit 502 to be transmitted from headend 104 to client device 124. These three delays 602, 604, and 606 occupy approximately 20, 100, and 100 milliseconds, respectively. There are therefore approximately 220 milliseconds total that elapse between the channel change input from a viewer and the presentation of an initial image.

Fast tuning time 600 also includes buffer boost fill delay 608. Buffer boost fill delay 608 reflects the time required (i) to retrieve from broadcast video data 410 the multiple non-I units 504 that are of a size that is sufficient to fill buffer 426 and (ii) to transmit them from headend 104 to client device 124. The impact of either or both of these parts of buffer boost fill delay 608 may be reduced when they are overlapped in time with one or both of delays 604 and 606.

Buffer boost fill delay 608 is approximately 30 milliseconds, but this time period may vary significantly depending on the available bandwidth. Hence, the entire fast tuning time 600 is approximately 250 milliseconds. Furthermore, even a short buffer boost fill delay 608 may be essentially eliminated if the burst of broadcast video data, after the initial I unit 502, is transmitted at a rate of data delivery that is guaranteed to exceed the playout speed of the video.

In other words, the multiple non-I units 504 may be relatively quickly sent to client device 124 by transmitting them at a rate that exceeds a typical broadcast video data stream consumption rate at client device 124 in order to reduce or eliminate buffer boost fill delay 608. This relatively quick transmission is enabled by "borrowing" transient excess capacity from other subscribers on the same or a different digital channel.

Figure 7:
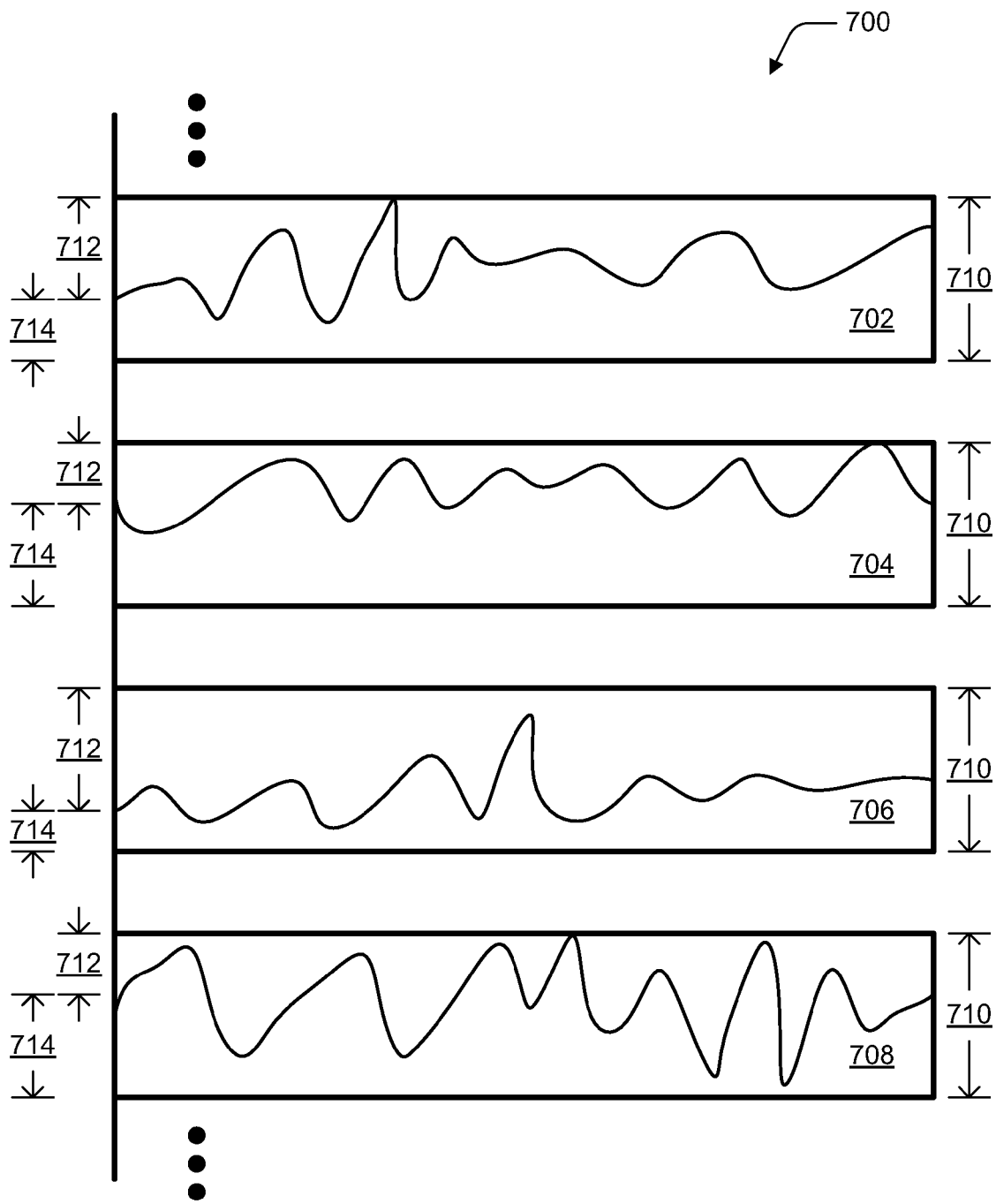
FIG. 7 is a set of graphs that illustrate transient excess bandwidth that may be shared among subscribers.

FIG. 7 is a set of graphs 700 that illustrate transient excess bandwidth 712 that may be shared among subscribers. Each digital channel of DV portion 208 of spectrum 200 (of FIG. 2) may support multiple subscribers, depending on the total bits per channel, the definition of the video, the compression technology, and so forth. Although 30-40 or more subscribers may be sharing a digital channel, only four (4) streams 702, 704, 706, and 708 for broadcast video data that is being transmitted from headend 104 to four (4) different client devices 124 are illustrated in the set of graphs 700.

These four streams 702, 704, 706, and 708 of broadcast video data are each allocated a maximum bandwidth 710. The current bandwidth utilization 714 per stream varies depending on the associated video content at any given time. The difference between maximum (allocated) bandwidth 710 and current bandwidth utilization 714 is transient excess bandwidth 712. This transient excess bandwidth 712, which is otherwise underutilized by a given subscriber at any given moment, may be shared by other subscribers when tuning to a new digital channel. In short, transient excess bandwidth 712 is used to fill buffer 426 with the multiple non-I units 504 that follow the most-recently-received I unit 502 at a rate that exceeds the decoding of the video data units by video decoder 424. Hence, presentation of the broadcast video may commence immediately following, or practically immediately following, receipt of the initial I unit 502, thus potentially eliminating buffer boost fill delay 608.

Fast digital channel changing may be described in the general context of electronically-executable instructions. Generally, electronically-executable instructions include routines, programs, objects, components, data structures, and the like that perform particular functions or implement particular abstract data types. Fast digital channel changing, as described in certain implementations herein, may be practiced in distributed computing environments where functions are performed by remotely-linked processing devices that are connected through a communications network. Especially in a distributed computing environment, electronically-executable instructions may be located in separate storage media and executed by different processors.

Figure 8:
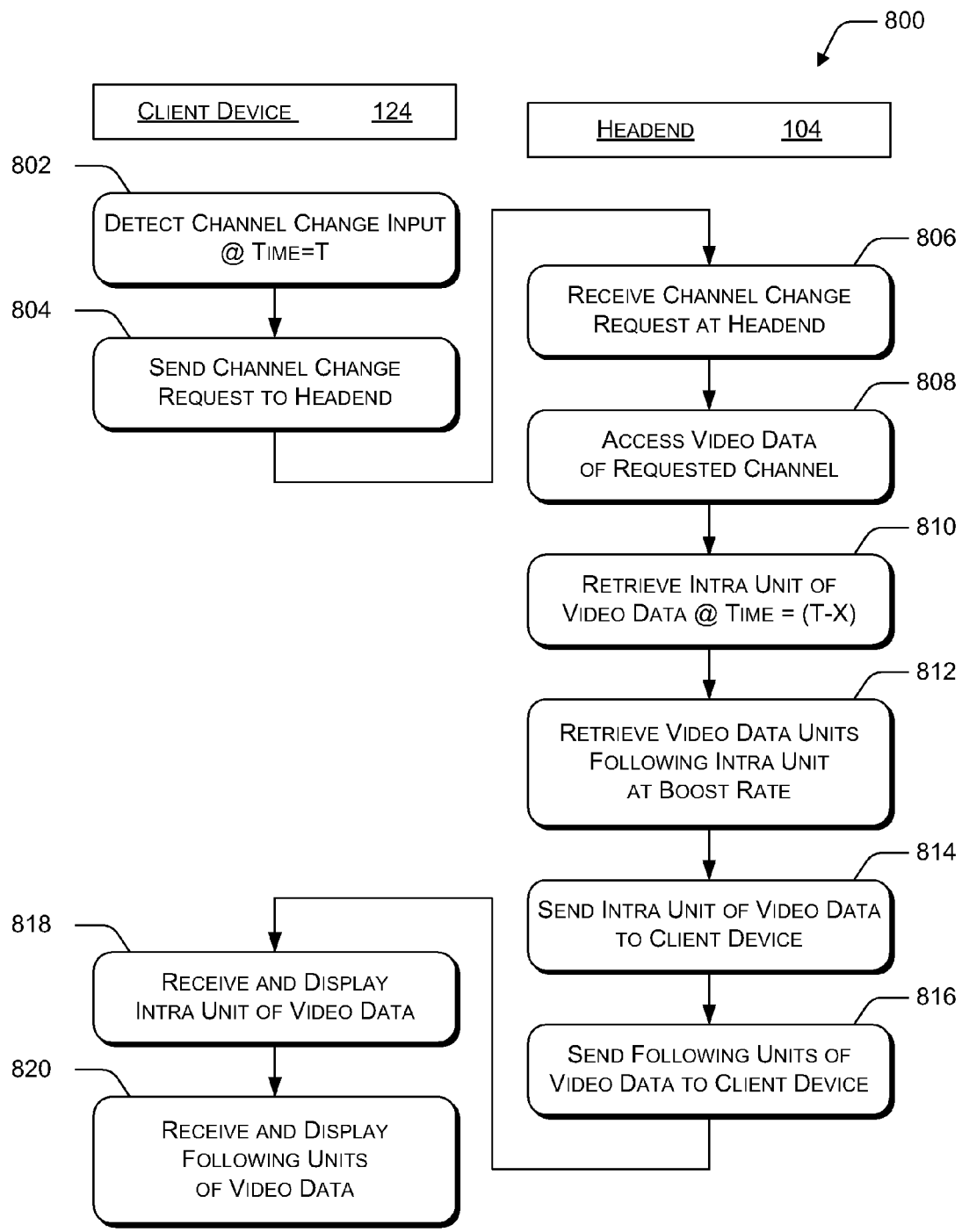
FIG. 8 is a flow diagram that illustrates an exemplary method for fast digital channel changing.

The methods and processes of FIG. 8 are illustrated in a flow diagram that is divided into multiple method blocks. However, the order in which the methods and processes are described is not intended to be construed as a limitation, and any number of the described blocks can be combined in any order to implement one or more methods or processes for fast digital channel changing. Furthermore, although the methods and processes are described below with reference to the broadcast video distribution implementations of FIGS. 1, 4, 5, etc. where applicable, the methods and processes can be implemented in any suitable hardware, software, firmware, or combination thereof and using any suitable network architectures, video compression technologies, and so forth.

FIG. 8 is a flow diagram 800 that illustrates an exemplary method for fast digital channel changing. Flow diagram 800 includes ten (10) method blocks 802-820. A client device 124 may implement four (4) blocks 802, 804, 818, and 820. A headend 104 may implement six (6) blocks 806, 808, 810, 812, 814, and 816. Alternatively, another network node that is upstream of the client device 124, such as a hub 114, may implement the six blocks 806-816. Furthermore, the actions of the six blocks 806-816 may be implemented by more than one upstream node, for example when different channels and/or programming times are stored as broadcast video data 410 in different data centers 108 (e.g., to implement data caching).

At block 802, a channel change input is detected at a time=T at the client device. For example, the client device 124 may receive a command from a subscriber via a remote control to change from a first channel to a second requested channel at a time=T. In response, the client device 124 prepares a channel change request 430. The channel change request 430 includes an indicator of the requested channel and may be in packet form. At block 804, the channel change request is sent to the headend from the client device. For example, the client device 124 may transmit the channel change request 430 to the headend 104 over a network 404, optionally through one or more intermediate upstream nodes such as a fiber node 118 or a hub 114.

At block 806, the channel change request is received at the headend from the client device. For example, the channel change request 430 may be received at a network interface 402 of the headend 104 via the network 404. At block 808, video data of the requested channel is accessed. For example, compressed broadcast video data of broadcast video data 410 that corresponds to the requested channel is located and accessed.

At block 810, an intra unit of video data at a time=(T−X) is retrieved. For example, where "X" equals an amount of temporal distance between the time of receiving a channel change input at the client device 124 and the time of receipt of a most recent past intra unit 502 at the headend 104, the intra unit 502 at time=(T−X) is retrieved from the broadcast video data 410 for the requested channel. In situations where the channel change request 430 transmission time from the client device 124 to the headend 104 is neither negligible nor otherwise discounted, the time=T may be considered to be the time at which the channel change request 430 is received at the headend 104. Thus, the temporal distance "X" along the broadcast video data stream of the requested channel in such situations is somewhat greater to account for the additional elapsed time of the channel change request 430 transmission, and the consequential receipt of additional non-intra units 504 at the headend 104.

At block 812, video data units that follow the located and/or retrieved intra unit are retrieved at a boost rate. For example, a sufficient number of non-intra broadcast video data units 504 are retrieved from the broadcast video data 410 of server storage 408A by server computer 408B at a rate that exceeds the expected decoding and playout speed thereof at the client device 124. These two retrievals of blocks 810 and 812 may be effectively completed as a single retrieval.

At block 814, the retrieved intra unit of video data is sent to the client device from the headend. For example, the intra unit 502 of broadcast video data is transmitted from the headend 104 over the network 404 to the client device 124, as part of video data 432. At block 816, the following units of video data are sent to the client device from the headend. For example, the non-intra units 504 of broadcast video data that temporally follow the intra unit 502 in the stream 500 for the requested channel are transmitted from the headend 104 to the client device 124 across the network 404, as part of the video data 432. Although the intra unit 502 of video data is decoded and displayed first at the client device 124, the units 502 and 504 of video data may be transmitted to the client device 124 in any suitable order or organizational grouping.

At block 818, the client device receives and displays the intra unit of video data. For example, the client device 124 may receive the intra unit 502 of broadcast video data as part of the video data 432 via the network 404 at a network interface 406. The network interface 406 provides the intra unit 502 of broadcast video data to a video decoder 424 so that the decoding and subsequent display thereof may begin. At block 820, the client device receives and displays the following units of video data. For example, the client device 124 may receive the non-intra units 504 of broadcast video data that follow the intra unit 502 as part of the video data 432 via the network 404 at the network interface 406. The network interface 406 provides the following non-intra units 504 of broadcast video data to a buffer 426 of the video decoder 424 so that the decoding and subsequent display thereof may begin with reference to the intra unit 502 of broadcast video data.

Existing Digital Channel Tuning Waterfall Effect

Figure 9:
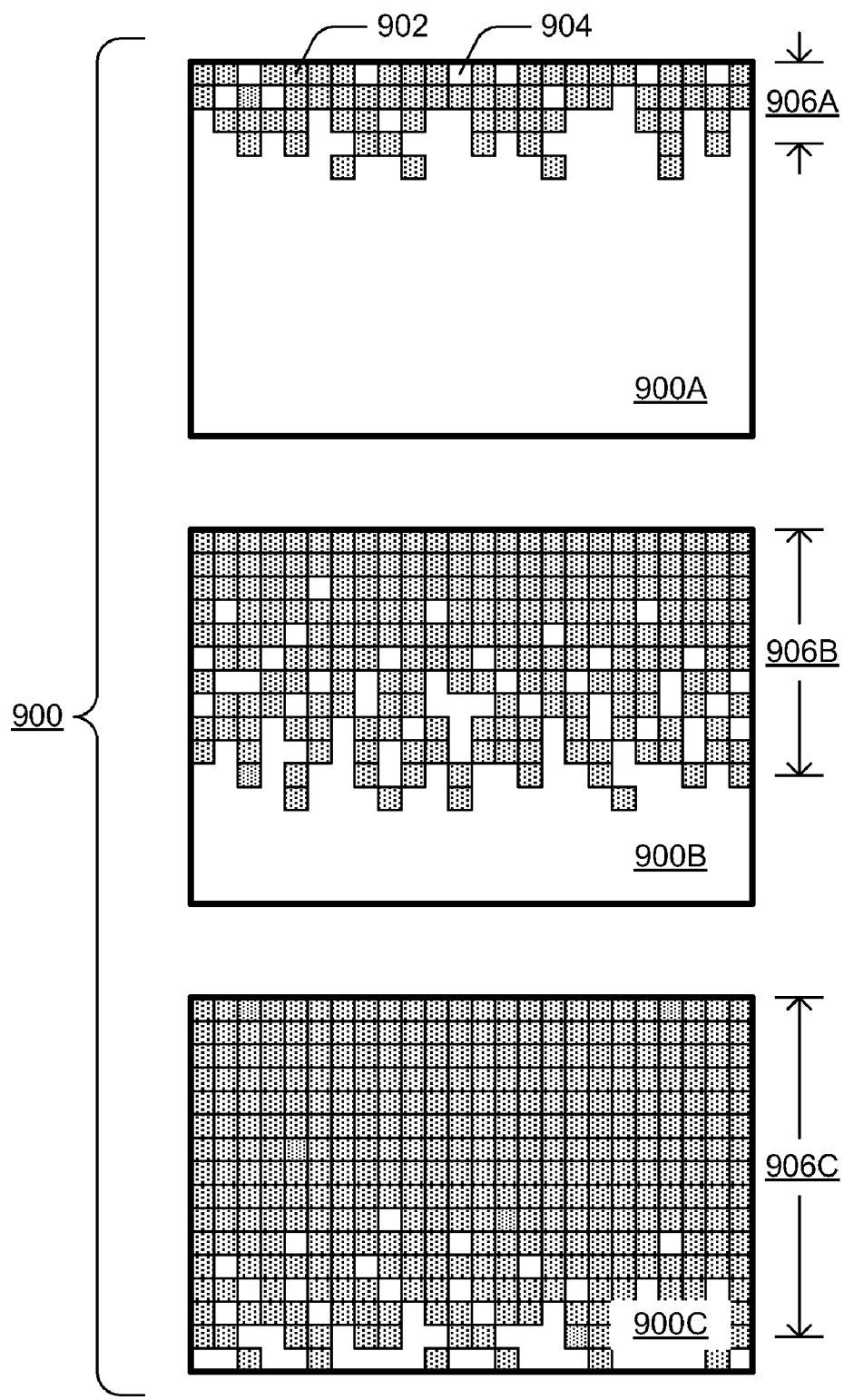
FIG. 9 illustrates a digital channel change that exhibits a waterfall effect in accordance with a conventional approach.

FIG. 9 illustrates a digital channel change 900 that exhibits a waterfall effect in accordance with a conventional approach. Digital channel change 900 includes three (3) screens 900A, 900B, and 900C. These three screens 900A-900C illustrate how an image is gradually displayed with video that is compressed using a macroblock-based algorithm in many conventional digital television networks. Time increases from screen 900A to 900B and from screen 900B to 900C. Although only three discrete screens 900A, 900B, and 900C are illustrated, the video presentation display is actually continuous from a black screen to a screen that is completely filled with macroblocks 902.

Screen 900A specifically indicates macroblocks 902 and macroblock gaps 904, which are typically black. Each of the screens 900A-900C includes these macroblocks 902 and macroblock gaps 904. As the video data arrives on a macroblock basis, macroblocks 902 are decoded and rendered on the screen. Although macroblock gaps 904 are present, the video presentation proceeds generally from the top of the screen to the bottom of the screen. For example, the portion 906 of the screen that is predominantly filled in with macroblocks 902 increases from 906A to 906B to 906C over approximately 1-2 seconds for screens 900A to 900B to 900C, respectively. The viewer is thus subjected to a lengthy and distracting waterfall effect when tuning to digital channels in many conventional digital television networks. Furthermore, even if macroblocks 902 are filled in around a screen randomly, pseudo-randomly, or in any other prescribed format, the viewer is still subjected to a lengthy and distracting initial video presentation upon changing to a digital channel.

Exemplary Approach(es) to Seamless Digital Channel Changing

Figure 10:
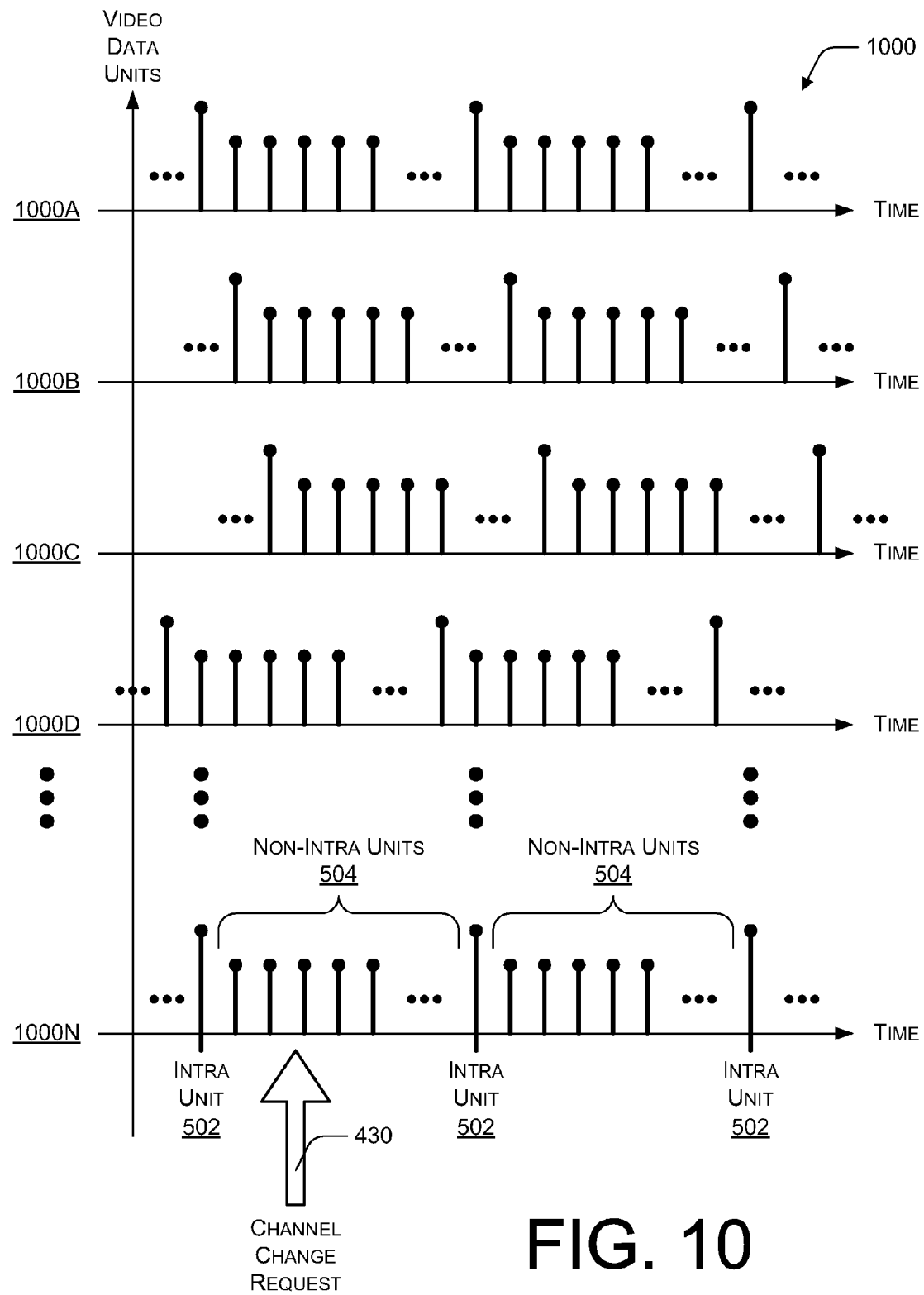
FIG. 10 illustrates an exemplary data stream for video that is compressed on a macroblock basis.

FIG. 10 illustrates an exemplary data stream 1000 for video that is compressed on a macroblock basis. Data stream 1000 pertains to "N" macroblocks and thus has N corresponding sub-streams 1000A, 1000B, 1000C, 1000D . . . 1000N. For each such sub-stream 1000n, video data units are graphed as rising upward parallel to the ordinate axis, and time is graphed as increasing in the rightward direction along the abscissa axis. As described further below, each sub-stream 1000n is shifted in time with respect to each other sub-stream 1000n. For example, sub-stream 1000A is shifted leftward as compared to, and thus arrives earlier than, sub-stream 1000C.

Generally, each sub-stream 1000n includes I units 502 and non-I units 504. In exemplary described implementations, I units 502 correspond to I macroblocks, and non-I units 504 correspond to P macroblocks. However, non-I units 504 may also correspond to B macroblocks. Hence, for each sub-stream 1000n such as sub-stream 1000D, each I macroblock is followed by a number of P macroblocks that are decodable based on the previous I macroblock. From time to time, such as at approximate intervals or every predetermined period, another I macroblock arrives along the sub-stream.

Each macroblock space on the screen is therefore associated with a sub-stream 1000n that includes I macroblocks and P macroblocks. Video decoding can be started at I macroblocks; consequently, the decoding and initial display for each macroblock space is started upon the arrival of an I macroblock that is associated with that macroblock space. The temporal location of I macroblocks for each of sub-streams 1000A, 1000B, 1000C, 1000D . . . 1000N is offset with respect to the temporal location of I macroblocks for each other sub-stream over the approximately two seconds that elapses between successive I units 502 in MPEG-2 coding implementations.

Upon changing to a digital channel when using an MPEG-2 algorithm, approximately two seconds can therefore elapse between the receipt, decoding, and display of a first I macroblock and the receipt, decoding, and display of the last I macroblock that causes the screen to be completely filled. This can lead to the waterfall effect when changing to a digital channel.

However, after the receipt and decoding of the constituent sub-streams 1000n of data stream 1000 is underway and ongoing, the images of the video thereof can be displayed without a waterfall effect and without any additional delay. Although sub-streams 1000A, 1000B, 1000C, 1000D . . . 1000N continue to be temporally overlapping such that I macroblocks for each macroblock space of the screen arrive at different times, the video image may be displayed smoothly. This smooth display, instead of the waterfall effect, may also be achieved upon changing to a new digital channel as described herein.

Figure 11:
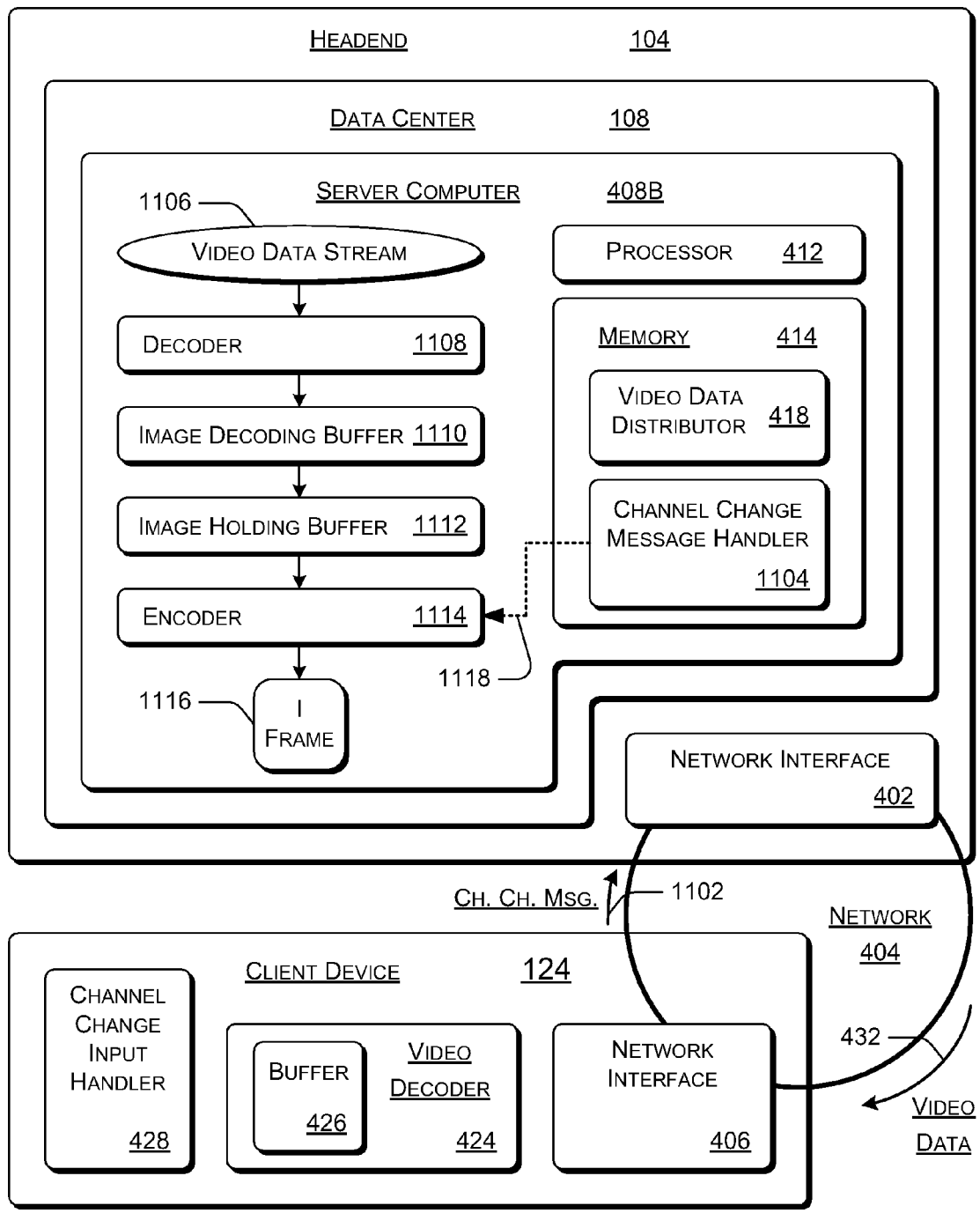
FIG. 11 illustrates an exemplary headend and an exemplary client device in which the systems and methods for seamless digital channel changing can be implemented.

FIG. 11 illustrates an exemplary headend 104 and an exemplary client device 124 in which the systems and methods for seamless digital channel changing can be implemented. Headend 104 uses a network interface 402 to communicate over a network 404, and client device 124 used a network interface 406 to communicate over network 404.

Network 404 can be any two-way unicast network as described above with reference to FIG. 4 and with respect to fast digital channel changing. For example, network 404 may enable the establishment of point to point Internet protocol (IP) sessions thereon. Alternatively, network 404 may be a video on demand (VOD) type network, a video over digital subscriber line (DSL)-based network, and so forth. Network 404 can also be any two-way broadcast network. For example, network 404 may comprise a traditional cable network in which the same digital video is broadcast to all or a relatively large subset of client devices 124. Other implementations for network 404 may also be employed.

Network 404 may include one or more other nodes that are upstream of client device 124 in addition to headend 104. For example, hubs 114 (of FIG. 1) and fiber nodes 118 may be located between client device 124 and headend 104 for forwarding/routing packets or other communications therebetween. Additionally, network 404 may be realized as a combination of networks.

Network interfaces 402 and 406 may vary depending on the architecture of network 404. In an exemplary cable network implementation, network interface 402 includes a CMTS (such as CMTS 110A) if there is no other intervening CMTS 110 in network 404. Network interface 406 includes a cable modem or other component for communicating messages to and from network 404. Network interface 402 and/or network interface 406 may also include components for interacting with an IP network, a DSL network, and so forth. These components may include a receiver, a transmitter, a transceiver, etc. that are adapted to interact with the appropriate network.

In exemplary described implementations for seamless digital channel changing, broadcast video distribution from headend 104 to client device 124 is effectuated using one of two primary manners. In the first primary manner, a point to point IP session is established between headend 104 and client device 124. Broadcast video data 432 for a specific channel is streamed to client device 124 across network 404. Thus, each client device 124 receives its own designated broadcast video data stream according to its corresponding requested channel. As a consequence, each fiber node 118 (of FIG. 1), if present, has a different current allocation of the two-way portion of the network that is intended for digital-video-related downstream transmissions to client devices 124. This two-way spectrum portion may correspond to DV portion 208 (of FIG. 2).

The second primary manner for broadcast video distribution from headend 104 to client device 124 entails client device 124 tuning to the desired digital video channel that is being broadcast to at least a relatively large subset of client devices 124 as broadcast video data 432 via network 404. Thus, each client device 124 selects from the standard set of broadcast video data streams according to the channel request input provided by a user. As a consequence, each fiber node 118 (of FIG. 1), if present, may have an identical allocation of the two-way portion of the network that is intended for digital-video-related downstream transmissions to client devices 124. This two-way spectrum portion may also correspond to DV portion 208 (of FIG. 2).

For either primary manner, or other manners, of broadcast video distribution from headend 104 to client device 124, seamless digital channel changing may be effectuated as follows. Client device 124 includes a channel change input handler 428, a video decoder 424, and network interface 406. Video decoder 424 may include a buffer 426 for storing received broadcast video data prior to decoding. Channel change input handler 428 receives a channel change input from a user (not shown) that orders a change to a requested new channel. The channel change input may be received from a remote control, a keyboard, a PDA or similar, a touch-sensitive screen, integrated keys, and so forth.

Channel change input handler 428 may be realized as executable instructions and/or hardware, software, firmware, or some combination thereof. Channel change input handler 428 constructs a channel change message 1102 in, e.g., packet form that includes an indicator of the new channel. For the first described primary manner, channel change message 1102 may comprise a channel change request, such as channel change request 430 as described above. The new channel may therefore comprise the requested channel.

For the second described primary manner, channel change message 1102 may comprise a channel change notification inasmuch as client device 124 in such an implementation may tune to the new channel without making a request to headend 104 for a special data stream or data stream change. Client device 124 may merely notify headend 104 that it is tuning to a new broadcast video data stream. In either primary or any other manner, channel change message 1102 is provided from channel change input handler 428 to network interface 406 of client device 124 for transmission over network 404.

Network interface 402 of headend 104 receives channel change message 1102 via network 404. Network interface 402 provides channel change message 1102 to data center 108. Although it may, data center 108 of FIG. 11 need not necessarily retain the broadcast video data that is received by headend 104 from broadcast center 102 (of FIG. 1). Data center 108, in an exemplary implementation, includes a server architecture 408.

Server architecture 408 includes a server computer 408B. Server architecture 408 may also include a server storage 408A, as described further above with reference to FIG. 4, in order to provide network-level digital video recording (DVR) and playback, fast digital channel changing, and so forth. Server computer 408B of FIG. 11 may also perform the functions of server computer 408B of FIG. 4 in order to implement fast digital channel changing. Alternatively, the functions of server computer 408B of FIG. 4 may not be performed by data center 108, may be performed by a different server computer (not explicitly illustrated in FIG. 11) of data center 108, and so forth.

Server computer 408B enables an entire image frame of broadcast video data to be quickly displayed by client devices 124 upon digital channel changes even when the broadcast video data is compressed using an algorithm having temporally-distributed I macroblocks. Server computer 408B includes one or more processors 412 and one or more memories 414. Although not shown, server computer 408B may also include other components such as input/output interfaces; a local disk drive; hardware and/or software for encoding, decoding, and otherwise manipulating video data, and so forth. Memory 414 may include a non-volatile memory such as disk drive(s) or flash memory and/or volatile memory such as RAM. In an exemplary described implementation, memory 414 includes electronically-executable instructions.

Specifically, memory 414 includes the following electronically-executable instructions: a channel change message handler 1104 and a video data distributor 418. The electronically-executable instructions of memory 414 may be executed on processor 412 to effectuate functions as described below. In alternative implementations, one or more of channel change message handler 1104 and video data distributor 418 may be stored in a memory such that they are hardware encoded for automatic execution and/or for faster execution by a processor 412.

Network interface 402 forwards channel change message 1102 to channel change message handler 1104. Channel change message handler 1104 isolates the new channel from channel change message 1102 and provides an encoding signal 1118 to an encoder 1114. Encoding signal 1118 is provided to the encoder 1114 that corresponds to the new channel, or encoding signal 1118 is provided to a general encoder 1114 with an indication of the new channel being included therewith. Encoding signal 1118 prompts encoder 1114 to produce an I frame 1116.

In other words, an I frame 1116 for a current image is essentially immediately produced. This I frame 1116 for the new channel may be transmitted to client device 124 and displayed thereat. Consequently, a viewer at client device 124 may be quickly presented with an entire image frame from the broadcast video data of the new channel without a waterfall effect or a solid black screen for an interminable time period.

To avoid the waterfall effect, a described implementation includes four (4) elements: a decoder 1108, an image decoding buffer 1110, an image holding buffer 1112, and encoder 1114. These four elements receive as input video data stream 1106 and produce as output I frame(s) 1116.

Specifically, video data stream 1106 is input to server computer 408B. Video data stream 1106 may arrive from broadcast center 102 (of FIG. 1) via transmission media 106 or any other media. Video data stream 1106 may be comprised of broadcast video data units that are coded on a macroblock basis, such as data stream 1000 (of FIG. 10). Hence, the I macroblocks for all macroblock spaces on the screen are distributed temporally over a time period that at least approximately equals the duration between two successive I macroblock arrivals for any given sub-stream 1000$n$.

Video data stream 1106 is forwarded to decoder 1108. Decoder 1108 operates in accordance with whatever coding algorithm is applicable to video data stream 1106, such as MPEG-4 for example. Decoder 1108 continuously decodes video data stream 1106 into image decoding buffer 1110. In other words, each displayable image frame of the broadcast video is decoded into decoded images and placed in image decoding buffer 1110. If, for example, thirty (30) displayable image frames are to be displayed per second at client device 124, image decoding buffer 1110 is filled thirty (30) times per second (or 30 different spaces of image decoding buffer 1110 are filled each second). Thus, in this example, each image frame time slot equals one-thirtieth (1/30) of a second.

At the end of each image frame time slot, the decoded image is forwarded to image holding buffer 1112. Image holding buffer 1112 holds the decoded image for the duration of the subsequent image frame time slot while decoder 1108 is producing the subsequent decoded image in image decoding buffer 1110. At the conclusion of the subsequent image frame time slot, the subsequent decoded image is forwarded into image holding buffer 1112, thereby replacing the previous decoded image. Alternatively, image holding buffer 1112 may be capable of storing multiple decoded images such that a previous decoded image is not immediately aged out of image holding buffer 1112 by an immediately-subsequent decoded image.

While image holding buffer 1112 is holding a decoded image from image decoding buffer 1110 as produced by decoder 1108, encoder 1114 selectively elects to receive the decoded image for encoding thereat. Encoder 1114 elects to receive the decoded image from image holding buffer 1112 if encoding signal 1118 is received by encoder 1114 from channel change message handler 1104. If selected, the current decoded image is accepted at encoder 1114 and encoded into a complete I frame 1116, which is output from encoder 1114. In an alternative implementation, encoding signal 1118 may be provided to image holding buffer 1112 to thereby cause image holding buffer 1112 to forward the current decoded image to encoder 1114 responsive to the receipt of encoding signal 1118. Using these approaches, an I frame 1116 that covers an entire screen, as opposed to individual I macroblocks that only cover macroblock spaces, can be created for any image frame time slot.

Decoder 1108 and encoder 1114 may be separate and/or discrete components of server computer 408B. Alternatively, decoder 1108 and encoder 1114 may be electronically-executable instructions that are stored in a memory, such as memory 414. Image decoding buffer 1110 and image holding buffer 1112 may be individual, dedicated, and/or special-purpose latches that are used by decoder 1108 and encoder 1114. Alternatively, image decoding buffer 1110 and image holding buffer 1112 may be part of a general and/or shared memory, such as memory 414.

It should be noted that the electronically-executable instructions of channel change message handler 1104, video data distributor 418, and possibly decoder 1108 as well as encoder 1114, may be combined or otherwise alternatively organized. For example, the electronically-executable instructions of channel change message handler 1104 may be combined with those of encoder 1114.

Elements 1108-1114, as well as the functions thereof, may be repeated for each digital video data stream 1106 that is received by headend 104. Complete I frames 1116 may therefore be synthesized for any image frame time slot for any digital video channel. These synthesized I frames 1116 are provided to video data distributor 418.

Consequently, video data distributor 418 accepts an I frame 1116 from encoder 1114 that is for the new channel as indicated by channel change message 1102. Video data distributor 418 provides I frame 1116 to network interface 402. Network interface 402 transmits the broadcast video data information as encoded in I frame 1116 over network 404 as video data 432. Client device 124 receives video data 432 via network 404 at network interface 406.

After network interface 406 of client device 124 receives I frame 1116 for the new channel, network interface 406 forwards I frame 1116 to video decoder 424. Video decoder 424 decodes I frame 1116 in preparation for rendering the decoded video image on a screen. The decoded image for an entire screen is then displayed on a screen that is associated with client device 124.

Buffer 426, which if present can be used to facilitate the decoding of a video data stream, may be realized as a dedicated and/or specialized memory, as part of a memory that is shared for other purposes, and so forth. Although not shown, client device 124 may also include other components and/or electronically-executable instructions, such as an operating system, analog tuners, non-volatile memory storage, RAM, audio/video outputs, one or more specialized and/or general-purpose processors, and so forth.

Seamless digital channel changing may optionally be used in conjunction with fast digital channel changing as described hereinabove. In other words, the functions of video data extractor 416, video data booster 420, etc. as described above with reference to FIG. 4 et seq. may be used along with (the functions of) decoder 1108, encoder 1114, etc. as described with reference to FIG. 10 et seq. Hence, previously-received broadcast video data, as well as buffer 426-sized boosts of broadcast video data, may be transmitted from headend 104 to client device 124 along with a synthesized I frame 1116. Although this combination is more easily implemented with the first primary manner for broadcast video distribution (e.g., in a two-way unicast network), this combination may also be implemented with the second primary manner for broadcast video distribution (e.g., in a two-way broadcast network).

Seamless digital channel changing may be described in the general context of electronically-executable instructions. Generally, electronically-executable instructions include routines, programs, objects, components, data structures, and the like that perform particular functions or implement particular abstract data types. Seamless digital channel changing, as described in certain implementations herein, may be practiced in distributed computing environments where functions are performed by remotely-linked processing devices that are connected through a communications network. Especially in a distributed computing environment, electronically-executable instructions may be located in separate storage media and executed by different processors.

Figure 12:
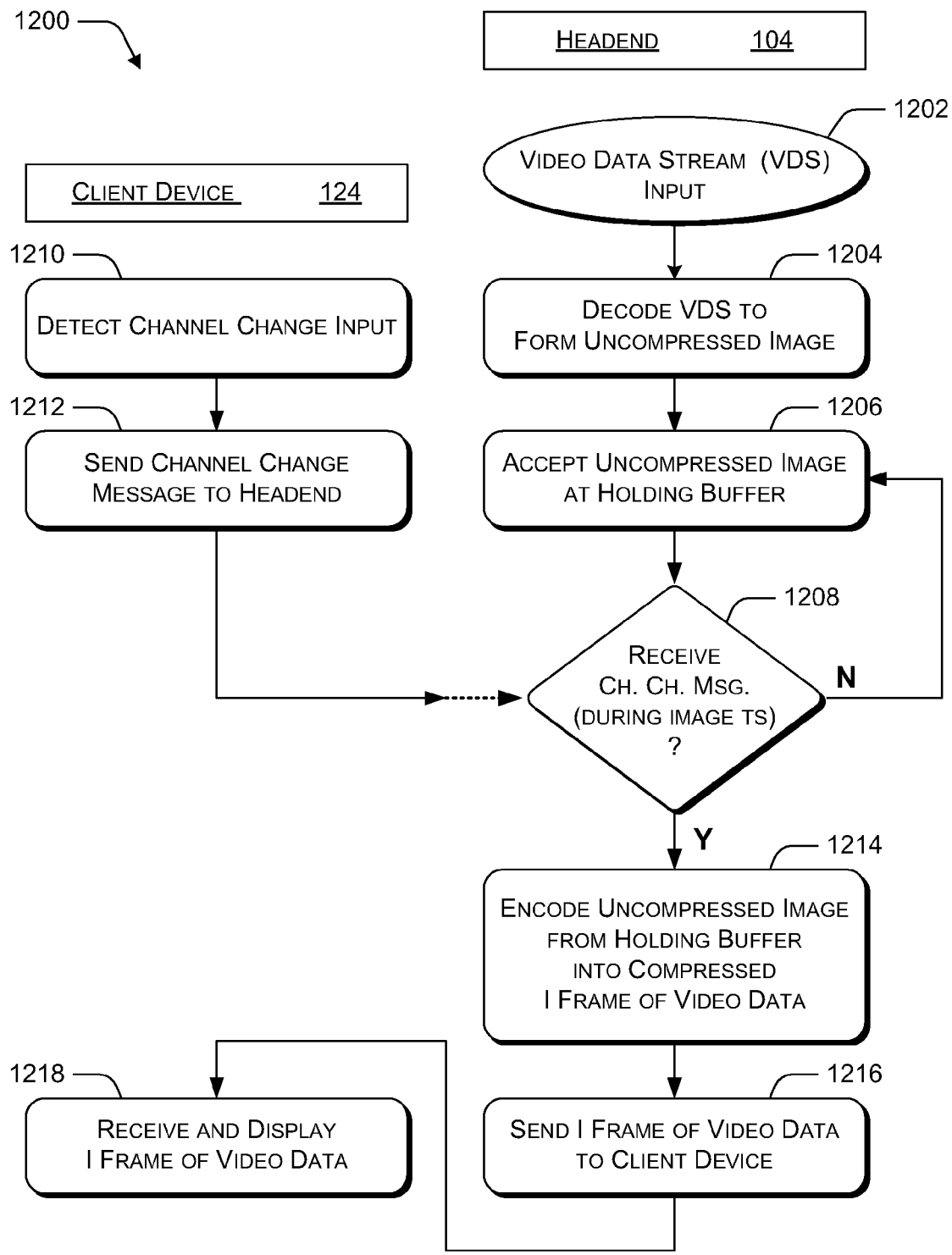
FIG. 12 is a flow diagram that illustrates an exemplary method for seamless digital channel changing.

The methods and processes of FIG. 12 are illustrated in a flow diagram that is divided into multiple method blocks. However, the order in which the methods and processes are described is not intended to be construed as a limitation, and any number of the described blocks can be combined in any order to implement one or more methods or processes for seamless digital channel changing. Furthermore, although the methods and processes are described below with reference to the broadcast video distribution implementations of FIGS. 1, 10, 11, etc. where applicable, the methods and processes can be implemented in any suitable hardware, software, firmware, or combination thereof and using any suitable network architectures, video compression technologies, and so forth.

FIG. 12 is a flow diagram 1200 that illustrates an exemplary method for seamless digital channel changing. Flow diagram 1200 includes eight (8) method blocks 1204-1218. A client device 124 may implement three (3) blocks 1210, 1212, and 1218. A headend 104 may implement five (5) blocks 1204, 1206, 1208, 1214, and 1216. Alternatively, another network node that is upstream of the client device 124, such as a hub 114, may implement the five blocks 1204, 1206, 1208, 1214, and 1216. Furthermore, the actions of the five blocks 1204, 1206, 1208, 1214, and 1216 may be implemented by more than one upstream node, for example when the broadcast video of different channels is decoded into decoded images for possible encoding into I frames at different data centers 108 (e.g., to distribute the workload and/or congestion across the network).

At oval 1202, the headend receives a video data stream (VDS) input. For example, the headend 104 receives broadcast video data in a compressed data stream 1000 from a broadcast center 102 via one or more transmission media 106. At block 1204, the VDS is decoded to form an uncompressed image. For example, a decoder 1108 decompresses a VDS 1106 such as the compressed data stream 1000 in accordance with the corresponding coding algorithm, such as MPEG-4.

At block 1206, the uncompressed image is accepted at a holding buffer. For example, the uncompressed image is provided from the decoder 1108/image decoding buffer 1110 to an image holding buffer 1112. Actions of blocks 1204 and 1206 may be performed continuously over time for each relevant digital channel for which broadcast video data is being received at a server computer 408B of the headend 104.

Meanwhile, at block 1210, a channel change input is detected at the client device. For example, the client device 124 may receive a command from a subscriber via a remote control to change from a first channel to a second new digital channel. In response, the client device 124 prepares a channel change message 1102. The channel change message 1102 includes an indicator of the new digital channel and may be in packet form.

At block 1212, the channel change message is sent to the headend from the client device. For example, the client device 124 may transmit the channel change message 1102 to the headend 104 over a network 404, optionally through one or more intermediate upstream nodes such as a fiber node 118 or a hub 114.

At block 1208, it is determined whether a channel change message has been 8 received at the headend from a client device during a given image frame time slot (TS). For example, this determination may be made by a channel change message handler 1104 of the server computer 408B. If a channel change message has not been received, then flow diagram 1200 continues automatically at block 1206 by accepting at the holding buffer the next image that has been decompressed. If, on the other hand, a channel change message has been received (e.g., as a result of the action(s) of block 1212) during the given image frame TS at block 1208, then flow diagram 1200 continues at block 1214. This routing of flow diagram 1200 to block 1214 may be effectuated, for example, by an encoding signal 1118.

At block 1214, the uncompressed image from the holding buffer is encoded into a compressed I frame of video data. For example, a displayable image frame, or decoded image, from the image holding buffer 1112 is provided to an encoder 1114 responsive to the encoding signal 1118. The encoder 1114 encodes the displayable image frame into a complete frame that is decodable without reference to any other frame, such as an I frame in accordance with an MPEG-4 algorithm. The uncompressed image corresponds to the new digital channel as indicated by the channel change message 1102.

At block 1216, the I frame of video data is sent to the client device from the headend. For example, the I frame 1116 of broadcast video data is transmitted from the headend 104 over the network 404 to the client device 124, as part of video data 432. At block 1218, the client device receives and displays the I frame of video data. For example, the client device 124 may receive the I frame 1116 of broadcast video data as part of the video data 432 via the network 404 at a network interface 406. The network interface 406 provides the I frame 1116 of broadcast video data to a video decoder 424 so that the decoding and subsequent display of the image thereof may begin.

Although systems and methods have been described in language specific to structural and functional features and/or methods, it is to be understood that the invention defined in the appended claims is not necessarily limited to the specific features or methods described. Rather, the specific features and methods are disclosed as exemplary forms of implementing the claimed invention.

The invention claimed is:

1. A system for smoothing channel changing in a digital video environment, the system comprising:
   a decoder that receives a digital video stream, the decoder decoding the digital video stream to produce a series of uncompressed images over time;
   an image holding buffer that accepts uncompressed images of the series of uncompressed images;
   an encoder that is capable of receiving at least one uncompressed image from the image holding buffer, the encoder adapted to encode the at least one uncompressed image into an intra frame; and
   a channel change message handler that is capable of communicating with the encoder, the channel change message handler adapted to activate the encoder to encode the at least one uncompressed image into the intra frame responsive to receipt of a channel change message from a client device to avoid a waterfall effect.

2. The system as recited in claim 1, further comprising:
   a video data distributor that is capable of receiving the intra frame, the video data distributor adapted to transmit the intra frame to the client device.

3. The system as recited in claim 1, further comprising:
   a video data distributor that is capable of receiving the intra frame from the encoder, the video data distributor adapted to transmit the intra frame to the client device using a network interface.

4. An arrangement for smoothing channel changing, the arrangement comprising:
   decoding means for decoding a video stream to produce decoded images;
   encoding means for selectively encoding selected ones of the decoded images of the decoding means to produce encoded intra frames; and
   handling means for handling channel change messages received from client devices, the handling means configured to cause the encoding means to select for encoding those decoded images of the decoding means that correspond to the channel change messages to avoid a waterfall effect.

5. The arrangement as recited in claim 4, further comprising:
   first buffering means for buffering each decoded image of the decoded images of the decoding means during decoding; and
   second buffering means for buffering each decoded image of the decoded images of the decoding means after decoding, the second buffering means in communication with the encoding means to facilitate encoding of the selected ones of the decoded images of the decoding means.

6. The arrangement as recited in claim 4, wherein each channel change message of the channel change messages that are received from client devices comprises at least one of a channel change request and or a channel change notification.

7. The arrangement as recited in claim 4, further comprising:
   interface means for interfacing with a network, the interface means configured to receive packets via and to transmit packets over the network; and
   distribution means for distributing the encoded intra frames to the client devices using the interface means.

8. The arrangement as recited in claim 7, wherein the network comprises at least one of an Internet protocol (IP)-based network or a digital subscriber line (DSL)-based network.

9. The arrangement as recited in claim 7, wherein the network comprises at least one of a two-way unicast network or a two-way broadcast network.

10. A method for smoothing channel changing in a video broadcast environment, the method comprising actions of:
    decoding a video data stream to produce a first decoded image;
    holding the first decoded image in an electronic memory device during an image frame time slot;
    decoding the video data stream to produce a second decoded image;

determining whether a channel change message has been received from a client device during the image frame time slot; and if so, to avoid a waterfall effect, encoding the first decoded image into an intra frame of video data; and sending the intra frame of video data to the client device.

11. The method as recited in claim 10, the method further comprising actions of:

if not, holding the second decoded image during a subsequent image frame time slot; and decoding the video data stream into a third decoded image.

12. The method as recited in claim 10, the method further comprising an action of:

receiving the channel change message from the client device, the channel change message including an indication of a new channel.

13. The method as recited in claim 10, wherein the method is performed at a headend of a television-based entertainment network.

14. The method as recited in claim 10, wherein the action of decoding the video data stream to produce a second decoded image is performed during the image frame time slot.

15. The method as recited in claim 10, wherein the second decoded image immediately follows the first decoded image.

16. One or more computers comprising one or more processors and electronically-accessible media, the electronically-accessible media comprising electronically-executable instructions that, when executed, direct the one or more processors to perform the method as recited in claim 10.

* * * * *